United States Patent
Swoboda et al.

(10) Patent No.: US 6,754,599 B2
(45) Date of Patent: Jun. 22, 2004

(54) DEBUG OUTPUT LOOSELY COUPLED WITH PROCESSOR BLOCK

(75) Inventors: Gary L. Swoboda, Sugarland, TX (US); Robert A. McGowan, Monroeville, PA (US)

(73) Assignee: Texas Instruments Incorporated, Dallas, TX (US)

( * ) Notice: Subject to any disclaimer, the term of this patent is extended or adjusted under 35 U.S.C. 154(b) by 672 days.

(21) Appl. No.: 09/740,868

(22) Filed: Dec. 21, 2000

(65) Prior Publication Data

US 2002/0006451 A1 Jan. 17, 2002

Related U.S. Application Data

(60) Provisional application No. 60/219,340, filed on Mar. 2, 2000.

(51) Int. Cl.$^7$ .............................................. G01R 25/00
(52) U.S. Cl. ......................... 702/79; 702/117; 702/118; 702/122
(58) Field of Search .......................... 702/79, 123, 117, 702/118, 122, 125, 189, 190; 331/18, 51, 57, 1, 2, 10; 711/4; 703/14

(56) References Cited

U.S. PATENT DOCUMENTS

| | | | | |
|---|---|---|---|---|
| 4,752,196 A | | 6/1988 | Wolfe, Jr. ..................... | 425/67 |
| 4,934,916 A | | 6/1990 | Lambertus .................... | 425/67 |
| 6,272,190 B1 | * | 8/2001 | Campana, Jr. ............... | 375/347 |
| 6,307,868 B1 | * | 10/2001 | Rakib et al. ................. | 370/485 |
| 6,496,940 B1 | * | 12/2002 | Horst et al. .................... | 714/4 |
| 6,677,989 B1 | * | 1/2004 | Aizawa et al. ........... | 348/207.1 |

FOREIGN PATENT DOCUMENTS

JP         1-278312        11/1989

OTHER PUBLICATIONS

ARM Limited, RDI 1.5.1tx and RDI 1.5.1rt; Doc. No. RDI–0032–CUST–ESPC–A; May 19, 2000; pp. 1–55.
ARM Limited, ETM9, Rev. 1, Technical Reference Manual, Doc. No. DDI 0157C, pp. i—Index–3.
ARM Limited, Embedded Trace Macrocell, Rev. 1, Specification, Doc. No. IHI 0014E, pp. i—Index–3.

* cited by examiner

Primary Examiner—Marc S. Hoff
Assistant Examiner—Felix Suarez
(74) Attorney, Agent, or Firm—Robert D. Marshall, Jr.; W. James Brady; Frederick J. Telecky, Jr.

(57) ABSTRACT

An intergrated circuit constructed for easy debug and emulation includes a function clock circuit and an operation circuit operating in synchronism with a function clock. A trace trigger circuit triggers trace operation upon detection of a predetermined condition within the operation circuit. A FIFO buffer receives the trace data which is exported via a trace port. The integrated circuit includes an oscillator clock circuit which may be synchronized with the function clock or a reference clock. The trace trigger circuit and the FIFO input operate on the function clock. The FIFO output and the trace port operate on the oscillator clock. Thus the trace may operate all on the function clock or be split between the function clock and the reference clock. Accordingly, the trace export can operate at a frequency independent of the operation circuit.

6 Claims, 8 Drawing Sheets

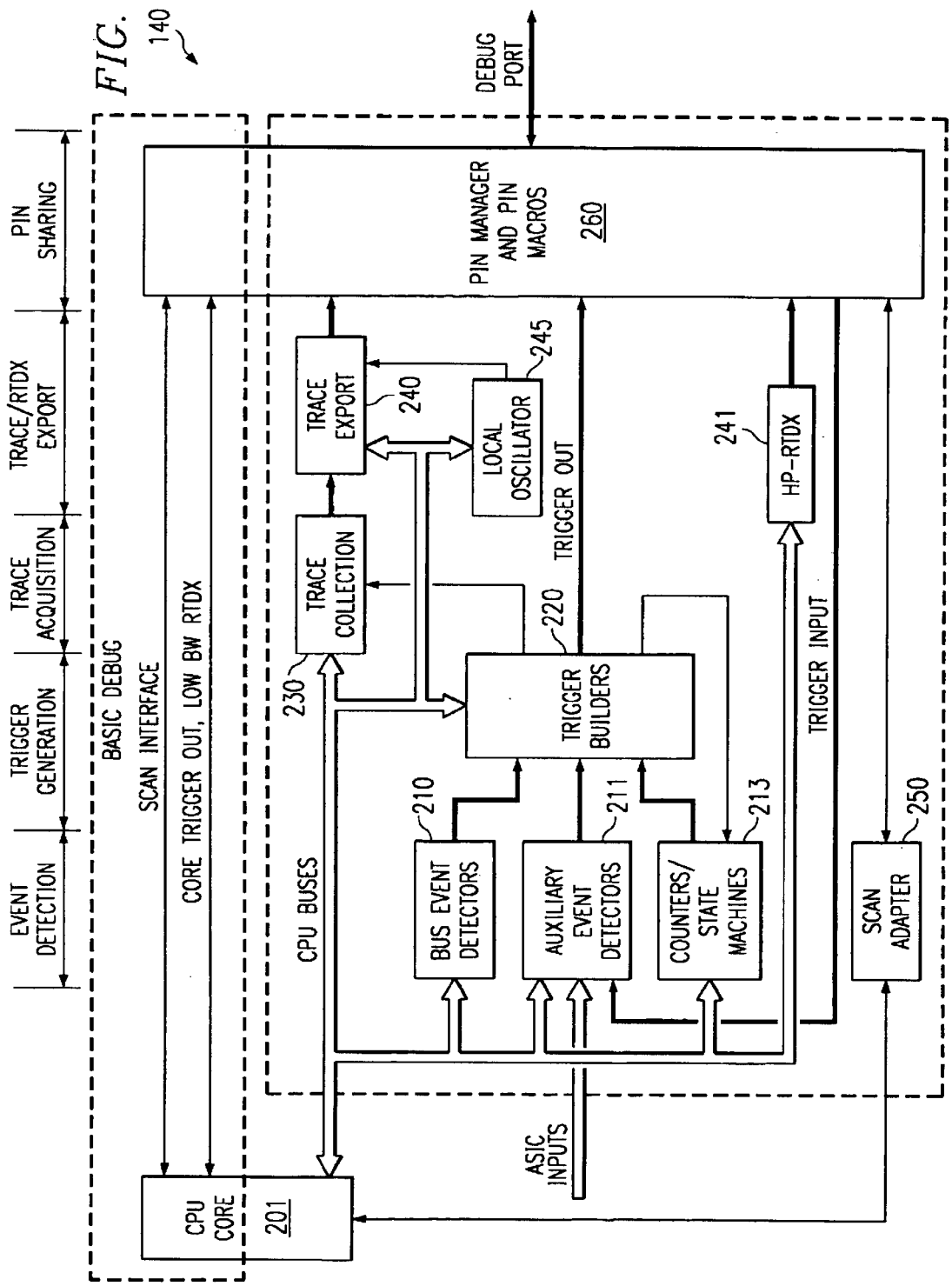

DEBUG OUTPUT LOOSELY COUPLED WITH PROCESSOR BLOCK

This application claims priority under 35 U.S.C. 119(e)(1) from U.S. Provisional Application No. 60/219,340 filed Mar. 2, 2000.

TECHNICAL FIELD OF THE INVENTION

The technical field of this invention is emulation hardware particularly for highly integrated digital signal processing systems and particularly clocking control for emulation data output.

BACKGROUND OF THE INVENTION

Advanced wafer lithography and surface-mount packaging technology are integrating increasingly complex functions at both the silicon and printed circuit board level of electronic design. Diminished physical access to circuits for test and emulation is an unfortunate consequence of denser designs and shrinking interconnect pitch. Designed-in testability is needed so the finished product is both controllable and observable during test and debug. Any manufacturing defect is preferably detectable during final test before a product is shipped. This basic necessity is difficult to achieve for complex designs without taking testability into account in the logic design phase so automatic test equipment can test the product.

In addition to testing for functionality and for manufacturing defects, application software development requires a similar level of simulation, observability and controllability in the system or sub-system design phase. The emulation phase of design should ensure that a system of one or more ICs (integrated circuits) functions correctly in the end equipment or application when linked with the system software. With the increasing use of ICs in the automotive industry, telecommunications, defense systems, and life support systems, thorough testing and extensive real-time debug becomes a critical need.

Functional testing, where the designer generates test vectors to ensure conformance to specification, still remains a widely used test methodology. For very large systems this method proves inadequate in providing a high level of detectable fault coverage. Automatically generated test patterns are desirable for full testability, and controllability and observability. These are key goals that span the full hierarchy of test from the system level to the transistor level.

Another problem in large designs is the long time and substantial expense involved in design for test. It would be desirable to have testability circuitry, system and methods that are consistent with a concept of design-for-reusability. In this way, subsequent devices and systems can have a low marginal design cost for testability, simulation and emulation by reusing the testability, simulation and emulation circuitry, systems and methods that are implemented in an initial device. Without a proactive testability, simulation and emulation plan, a large amount of subsequent design time would be expended on test pattern creation and upgrading.

Even if a significant investment were made to design a module to be reusable and to fully create and grade its test patterns, subsequent use of module may bury it in application specific logic. This would make its access difficult or impossible. Consequently, it is desirable to avoid this pitfall.

The advances of IC design are accompanied by decreased internal visibility and control, reduced fault coverage and reduced ability to toggle states, more test development and verification problems, increased complexity of design simulation and continually increasing cost of CAD (computer aided design) tools. In the board design the side effects include decreased register visibility and control, complicated debug and simulation in design verification, loss of conventional emulation due to loss of physical access by packaging many circuits in one package, increased routing complexity on the board, increased costs of design tools, mixed-mode packaging, and design for produceability. In application development, some side effects are decreased visibility of states, high speed emulation difficulties, scaled time simulation, increased debugging complexity, and increased costs of emulators. Production side effects involve decreased visibility and control, complications in test vectors and models, increased test complexity, mixed-mode packaging, continually increasing costs of automatic test equipment and tighter tolerances.

Emulation technology utilizing scan based emulation and multiprocessing debug was introduced over 10 years ago. In 1988, the change from conventional in circuit emulation to scan based emulation was motivated by design cycle time pressures and newly available space for on-chip emulation. Design cycle time pressure was created by three factors. Higher integration levels, such as increased use of on-chip memory, demand more design time. Increasing clock rates mean that emulation support logic causes increased electrical intrusiveness. More sophisticated packaging causes emulator connectivity issues. Today these same factors, with new twists, are challenging the ability of a scan based emulator to deliver the system debug facilities needed by today's complex, higher clock rate, highly integrated designs. The resulting systems are smaller, faster, and cheaper. They have higher performance and footprints that are increasingly dense. Each of these positive system trends adversely affects the observation of system activity, the key enabler for rapid system development. The effect is called "vanishing visibility".

FIG. 1 illustrates the trend in visibility and control over time an greater system integration. Application developers prefer the optimum visibility level illustrated in FIG. 1. This optimum visibility level provides visibility and control of all relevant system activity. The steady progression of integration levels and increases in clock rates steadily decrease the actual visibility and control available over time. These forces create a visibility and control gap, the difference between the optimum visibility and control level and the actual level available. Over time, this gap will widen. Application development tool vendors are striving to minimize the gap growth rate. Development tools software and associated hardware components must do more with less resources and in different ways. Tackling this the ease of use challenge is amplified by these forces.

With today's highly integrated System-On-a-Chip (SOC) technology, the visibility and control gap has widened dramatically over time. Traditional debug options such as logic analyzers and partitioned prototype systems are unable to keep pace with the integration levels and ever increasing clock rates of today's systems. As integration levels increase, system buses connecting numerous subsystem components move on chip, denying traditional logic analyzers access to these buses. With limited or no significant bus visibility, tools like logic analyzers cannot be used to view system activity or provide the trigger mechanisms needed to control the system under development. A loss of control accompanies this loss in visibility, as it is difficult to control things that are not accessible.

To combat this trend, system designers have worked to keep these buses exposed. Thus the system components were built in a way that enabled the construction of prototyping systems with exposed buses. This approach is also under siege from the ever-increasing march of system clock rates. As the central processing unit (CPU) clock rates increase, chip to chip interface speeds are not keeping pace. Developers find that a partitioned system's performance does not keep pace with its integrated counterpart, due to interface wait states added to compensate for lagging chip to chip communication rates. At some point, this performance degradation reaches intolerable levels and the partitioned prototype system is no longer a viable debug option. In the current era production devices must serve as the platform for application development.

Increasing CPU clock rates are also limiting availability of other simple visibility mechanisms. Since the CPU clock rates can the exceed maximum I/O state rates, visibility ports exporting information in native form can no longer keep up with the CPU. On-chip subsystems are also operated at clock rates that are slower than the CPU clock rate. This approach may be used to simplify system design and reduce power consumption. These developments mean simple visibility ports can no longer be counted on to deliver a clear view of CPU activity. As visibility and control diminish, the development tools used to develop the application become less productive. The tools also appear harder to use due to the increasing tool complexity required to maintain visibility and control. The visibility, control, and ease of use issues created by systems-on-a-chip tend to lengthen product development cycles.

Even as the integration trends present developers with a tough debug environment, they also present hope that new approaches to debug problems will emerge. The increased densities and clock rates that create development cycle time pressures also create opportunities to solve them. On-chip, debug facilities are more affordable than ever before. As high speed, high performance chips are increasingly dominated by very large memory structures, the system cost associated with the random logic accompanying the CPU and memory subsystems is dropping as a percentage of total system cost. The incremental cost of several thousand gates is at an all time low. Circuits of this size may in some cases be tucked into a corner of today's chip designs. The incremental cost per pin in today's high density packages has also dropped. This makes easy to allocate more pins for debug. The combination of affordable gates and pins enables the deployment of new, on-chip emulation facilities needed to address the challenges created by systems-on-a-chip.

When production devices also serve as the application debug platform, they must provide sufficient debug capabilities to support time to market objectives. Since the debugging requirements vary with different applications, it is highly desirable to be able to adjust the on-chip debug facilities to balance time to market and cost needs. Since these on-chip capabilities affect the chip's recurring cost, the scalability of any solution is of primary importance. "Pay only for what you need" should be the guiding principle for on-chip tools deployment. In this new paradigm, the system architect may also specify the on-chip debug facilities along with the remainder of functionality, balancing chip cost constraints and the debug needs of the product development team.

FIG. 2 illustrates an emulator system 100 including four emulator components. These four components are: a debugger application program 110; a host computer 120; an emulation controller 130; and on-chip debug facilities 140. FIG. 2 illustrates the connections of these components. Host computer 120 is connected to an emulation controller 130 external to host 120. Emulation controller 130 is also connected to target system 140. The user preferably controls the target application on target system 140 through debugger application program 110.

Host computer 120 is generally a personal computer. Host computer 120 provides access the debug capabilities through emulator controller 130. Debugger application program 110 presents the debug capabilities in a user-friendly form via host computer 120. The debug resources are allocated by debug application program 110 on an as needed basis, relieving the user of this burden. Source level debug utilizes the debug resources, hiding their complexity from the user. Debugger application program 110 together with the on-chip trace and triggering facilities provide a means to select, record, and display chip activity of interest. Trace displays are automatically correlated to the source code that generated the trace log. The emulator provides both the debug control and trace recording function.

The debug facilities are preferably programmed using standard emulator debug accesses through a JTAG or similar serial debug interface. Since pins are at a premium, the preferred embodiment of the invention provides for the sharing of the debug pin pool by trace, trigger, and other debug functions with a small increment in silicon cost. Fixed pin formats may also be supported. When the pin sharing option is deployed, the debug pin utilization is determined at the beginning of each debug session before target system 140 is directed to run the application program. This maximizes the trace export bandwidth. Trace bandwidth is maximized by allocating the maximum number of pins to trace.

The debug capability and building blocks within a system may vary. Debugger application program 100 therefore establishes the configuration at run-time. This approach requires the hardware blocks to meet a set of constraints dealing with configuration and register organization. Other components provide a hardware search capability designed to locate the blocks and other peripherals in the system memory map. Debugger application program 110 uses a search facility to locate the resources. The address where the modules are located and a type ID uniquely identifies each block found. Once the IDs are found, a design database may be used to ascertain the exact configuration and all system inputs and outputs.

Host computer 120 generally includes at least 64 Mbytes of memory and is capable of running Windows 95, SR-2, Windows NT, or later versions of Windows. Host computer 120 must support one of the communications interfaces required by the emulator. These may include: Ethernet 10T and 100T, TCP/IP protocol; Universal Serial Bus (USB); Firewire IEEE 1394; and parallel port such as SPP, EPP, and ECP.

Host computer 120 plays a major role in determining the real-time data exchange bandwidth. First, the host to emulator communication plays a major role in defining the maximum sustained real-time data exchange bandwidth because emulator controller 130 must empty its receive real-time data exchange buffers as fast as they are filled. Secondly, host computer 120 originating or receiving the real-time data exchange data must have sufficient processing capacity or disc bandwidth to sustain the preparation and transmission or processing and storing of the received real-time data exchange data. A state of the art personal computer with a Firewire communication channel (IEEE 1394) is preferred to obtain the highest real-time data exchange bandwidth. This bandwidth can be as much as ten times greater performance than other communication options.

Emulation controller 130 provides a bridge between host computer 120 and target system 140. Emulation controller 130 handles all debug information passed between debugger application program 110 running on host computer 120 and a target application executing on target system 140. A presently preferred minimum emulator configuration supports all of the following capabilities: real-time emulation; real-time data exchange; trace; and advanced analysis.

Emulation controller 130 preferably accesses real-time emulation capabilities such as execution control, memory, and register access via a 3, 4, or 5 bit scan based interface. Real-time data exchange capabilities can be accessed by scan or by using three higher bandwidth real-time data exchange formats that use direct target to emulator connections other than scan. The input and output triggers allow other system components to signal the chip with debug events and vice-versa. Bit I/O allows the emulator to stimulate or monitor system inputs and outputs. Bit I/O can be used to support factory test and other low bandwidth, non-time-critical emulator/target operations. Extended operating modes are used to specify device test and emulation operating modes. Emulator controller 130 is partitioned into communication and emulation sections. The communication section supports host communication links while the emulation section interfaces to the target, managing target debug functions and the device debug port. Emulation controller 130 communicates with host computer 120 using one of industry standards communication links outlined earlier herein. The host to emulator connection is established with off the shelf cabling technology. Host to emulator separation is governed by the standards applied to the interface used.

Emulation controller 130 communicates with the target system 140 through a target cable or cables. Debug, trace, triggers, and real-time data exchange capabilities share the target cable, and in some cases, the same device pins. More than one target cable may be required when the target system 140 deploys a trace width that cannot be accommodated in a single cable. All trace, real-time data exchange, and debug communication occurs over this link. Emulator controller 130 preferably allows for a target to emulator separation of at least two feet. This emulation technology is capable of test clock rates up to 50 MHZ and trace clock rates from 200 to 300 MHZ, or higher. Even though the emulator design uses techniques that should relax target system 140 constraints, signaling between emulator controller 130 and target system 140 at these rates requires design diligence. This emulation technology may impose restrictions on the placement of chip debug pins, board layout, and requires precise pin timings. On-chip pin macros are provided to assist in meeting timing constraints.

The on-chip debug facilities offer the developer a rich set of development capability in a two tiered, scalable approach. The first tier delivers functionality utilizing the real-time emulation capability built into a CPU's mega-modules. This real-time emulation capability has fixed functionality and is permanently part of the CPU while the high performance real-time data exchange, advanced analysis, and trace functions are added outside of the core in most cases. The capabilities are individually selected for addition to a chip. The addition of emulation peripherals to the system design creates the second tier functionality. A cost-effective library of emulation peripherals contains the building blocks to create systems and permits the construction of advanced analysis, high performance real-time data exchange, and trace capabilities. In the preferred embodiment five standard debug configurations are offered, although custom configurations are also supported. The specific configurations are covered later herein.

SUMMARY OF THE INVENTION

An integrated circuit constructed for easy debug and emulation includes a function clock circuit and an operation circuit operating in synchronism with a function clock. A trace trigger circuit triggers trace operation upon detection of a predetermined condition within the operation circuit. A FIFO buffer receives the trace data which is exported via a trace port. The integrated circuit includes an oscillator clock circuit which may be synchronized with the function clock or a reference clock. The trace trigger circuit and the FIFO input operate on the function clock. The FIFO output and the trace port operate on the oscillator clock. Thus the trace may operate all on the function clock or be split between the function clock and the reference clock. Accordingly, the trace export can operate at a frequency independent of the operation circuit.

BRIEF DESCRIPTION OF THE DRAWINGS

These and other aspects of this invention are illustrated in the drawings, in which:

FIG. 3 illustrates in block diagram form a typical integrated circuit employing configurable emulation capability;

DETAILED DESCRIPTION OF PREFERRED EMBODIMENTS

Figure 1:
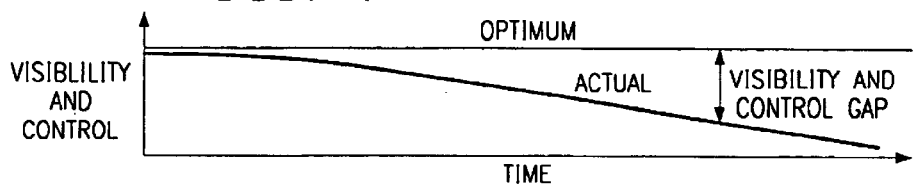
FIG. 1 illustrates the visibility and control of typical integrated circuits as a function of time due to increasing system integration.
Figure 2:
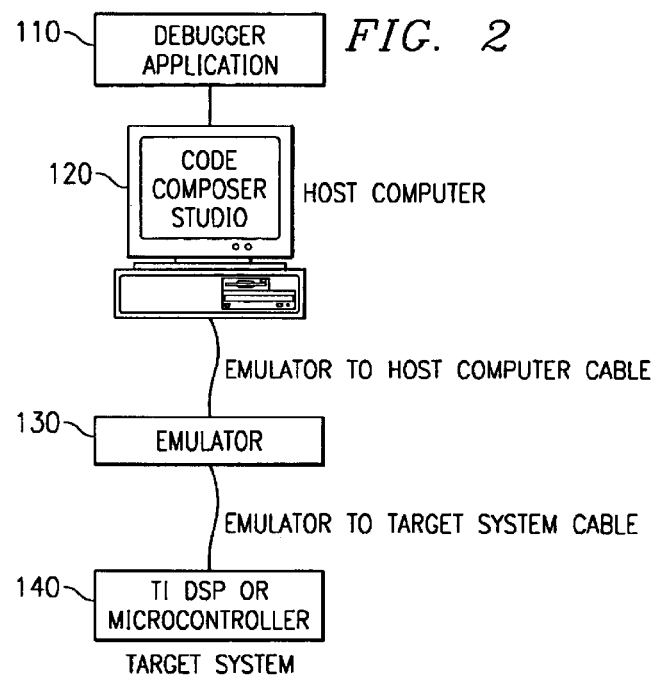
FIG. 2 illustrates an emulation system to which this invention is applicable.

The emulation technology of the present invention uses the debug upside opportunities noted above to provide developers with an arsenal of debug capability aimed at narrowing the control and visibility gap. This emulation technology delivers the solution to the complex debug problems of today's highly integrated embedded real-time systems. This technology attacks the loss of visibility, control, and ease of use issues described in the preceding section while expanding the feature set of current emulators.

The on-chip debug component of the present invention provides a means for optimizing the cost and debug capabilities. The architecture allows for flexible combinations of emulation components or peripherals tailored to meet system cost and time to market constraints. The scalability aspect makes it feasible to include them in production devices with manageable cost and limited performance overhead.

Emulation, debug, and simulation tools of the present invention are described herein. The emulation and debug solutions described herein are based on the premise that, over time, some if not most debug functions traditionally performed off chip must be integrated into the production device if they are to remain in the developer's debug arsenal. To support the migration of debug functions on chip, the present invention provides a powerful and scalable portfolio of debug capabilities for on-chip deployment. This technology preserves all the gains of initial JTAG technology while adding capabilities that directly assault the visibility, control, and ease of use issues created by the vanishing visibility trend.

Four significant architectural infrastructure components spearhead the assault on the control and visibility gap described earlier herein: real-time emulation (RTE); real-time data exchange (RTDX); trace; and advanced analysis.

Real-time emulation (RTE) provides a static view of the CPU and memory state after background program is stopped. Interrupt driven code continues to execute while the background program is stopped. Real time emulation provides basic debug capability of computational problems and code design problems.

Real-time emulation (RTE) provides a base set of fixed capabilities for real-time execution control (run, step, halt, etc.) and register/memory visibility. This component allows the user to debug application code while real-time interrupts continue to be serviced. Registers and memory may be accessed in real-time with no impact to interrupt processing. Users may distinguish between real-time and non real-time interrupts, and mark code that must not be disturbed by real-time debug memory accesses. This base emulation capability includes hardware that can be configured as two single point hardware breakpoints, a single data watchpoint, an event counter, or a data logging mechanism. The EMU pin capability includes trigger I/Os for multiprocessor event processing and a uni-directional (target to host) data logging mechanism.

Real-time data exchange (RTDX) enables debugger software to interact with the application code to exchange commands and data while the application continues to execute. Real-time data exchange employs analysis components to identify observation points and interrupt program flow to collect data. Real-time data exchange employs dynamic instrumentation, dynamic variable adjustments and dynamic data collection.

Real-time data exchange provides real-time data transfers between an emulator host and target application. This component offers both bi-directional and uni-directional DSP target/host data transfers facilitated by the emulator. The DSP (or target) application may collect target data to be transferred to the host or receive data from the host, while emulation hardware (within the DSP and the emulator) manages the actual transfer. Several RTDX transfer mechanisms are supported, each providing different levels of bandwidth and pin utilization allowing the trade off of gates and pin availability against bandwidth requirements.

Trace employs bus snooper hardware to collects selective program flow and data transactions for export without interacting with the application. Trace uses analysis components to define program segments and bus transactions that are to be recorded for export. Trace permits evaluation of program flow corruption, memory corruption and program timing problems. Trace enables benchmarking, code coverage measurement and path coverage measurement.

Trace is a non-intrusive mechanism of providing visibility of the application activity. Trace is used to monitor CPU related activity such as program flow and memory accesses, system activity such as ASIC state machines, data streams and CPU collected data. Historical trace technology also used logic analyzer like collection and special emulation (SEs) devices with more pins than a production device. The logic analyzer or like device processed native representations of the data using a state machine like programming interface (filter mechanism). This trace model relied on all activity being exported with external triggering selecting the data that needed to be stored, viewed and analyzed.

Existing logic-analyzer-like technology does not, however, provide a solution to decreasing visibility due to higher integration levels, increasing clock and more sophisticated packaging. In this model, the production device must provide visibility through a limited number of pins. The data exported is encoded or compressed to reduce the export bandwidth required. The recording mechanism becomes a pure recording device, packing exported data into a deep trace memory.

On-chip trace with high speed serial data export, in combination with advanced analysis provides a solution for SOC designs. Trace is used to monitor CPU related activity such as program flow and memory accesses, system activity such as ASIC state machines, data streams etc. and CPU collected data. This creates four different classes of trace data: program flow and timing provided by the DSP core (program counter trace); memory data references made by the DSP core or chip level peripherals (data reads and writes); application specific signals and data (ASIC activity); and CPU collected data. Collection mechanisms for the four classes of trace data are modular allowing the trade off of functionality verses gates and pins required to meet desired bandwidth requirements.

Real-time data exchange and trace functions provide similar, but different forms of visibility. They differ in terms of how data is collected, and the circumstances under which they would be most effective. Real-time Data exchange is a CPU assisted solution for exchanging information. The data to be exchanged have a well-defined behavior in relation to the program flow. Real-time data exchange can be used to record the input or output buffers from a DSP algorithm. Real-time data exchange requires CPU assistance in collecting data hence there is definite, but small, CPU bandwidth required to accomplish this. Real-time data exchange is an application intrusive mechanism of providing visibility with low recurring overhead cost.

Trace is a non-intrusive, hardware-assisted collection mechanism (such as bus snoopers) with very high bandwidth (BW) data export. Trace is used when there is a need to export data at a very high data rate or when the behavior of the information to be traced is not known, or is random in nature or associated with a address. Program flow is a typical example where it is not possible to know a priori the behavior. The bandwidth required to export this class of information is high. Data trace of specified addresses is another example. The bandwidth required to export data trace is very high.

Trace data is unidirectional, going from target to host only. Real-time data exchange can exchange data in either direction although unidirectional forms can be supported for data logging. The trace data path can also be used to provide very high speed uni-directional real-time data exchange such as CPU collected trace data.

Advanced analysis allows observation of occurrences of events or event sequences. Advanced analysis enables measurement of elapsed time between events. Advanced analysis can generate external triggers. Advanced analysis alters the program flow after the detection of events or event sequences. Advanced analysis is most useful for benchmarking, event/sequence identification, external trigger generation and stop program execution. Note that advanced analysis can be used to activate trace and real-time data exchange.

Advanced analysis provides a non-intrusive on-chip event detection and trigger generation mechanism. The trigger outputs created by advanced analysis control other infrastructure components such as Trace and real-time data exchange. Historical trace technology used bus activity exported to a logic analyzer to generate triggers that controlled trace within the logic analyzer unit or generated triggers which were supplied to the device to halt execution. This usually involved a chip that had more pins than the production device (an SE or special emulation device). This analysis model does not work well in the System-on-a-Chip (SOC) era as the integration levels and clock rates of today's devices preclude full visibility bus export.

Advanced analysis provides affordable on-chip instruction and data bus comparators, sequencers and state machines, and event counters to recreate the most important portions of the triggering function historically found off chip. Advanced analysis provides the control aspect of debug triggering mechanism for trace, real-time data exchange and real-time emulation. This architectural component identifies events, tracks event sequences, and assign actions based on their occurrence, such as break execution, enable/disable trace, count, enable/disable real-time data exchange. The modular building blocks for this capability include bus comparators, external event generators, state machines or state sequencers, and trigger generators. The modularity of the advanced analysis system allows the trade off of functionality verses gates.

Since the trace port bandwidth is a premium, the export mechanism provides for the export of trace information either at the processor clock rate or a rate that is asynchronous to the processor clock rate. The asynchronous export mode allows the trace port transmission rate to be maximized as it can be de-coupled from the processor clock rate. This is significant as is unlikely that the processor clock rate will match the optimum trace export rate in most applications. It is anticipated that this architecture will remain viable for processor clock rates of 1 GHz or more. The use of a local oscillator allows the trace port transmission to be loosely coupled to the packet generation. This allows the trace transmission rate to be optimized and the pin count minimized.

FIG. 3 illustrates an example of one on-chip debug architecture embodying target system 140. The architecture uses several module classes to create the debug function. One of these classes is event detectors including bus event detectors 210, auxiliary event detectors 211 and counters/state machines 213. A second class of modules is trigger generators including trigger builders 220. A third class of modules is data acquisition including trace collection 230 and formatting. A fourth class of modules is data export including trace export 240, and real-time data exchange export 241. Trace export 240 is controlled by clock signals from local oscillator 245. Local oscillator 245 will be described in detail below. A final class of modules is scan adapter 250, which interfaces scan input/output to CPU core 201. Final data formatting and pin selection occurs in pin manager and pin micros 260.

The size of the debug function and its associated capabilities for any particular embodiment of a system-on-chip may be adjusted by either deleting complete functions or limiting the number of event detectors and trigger builders deployed. Additionally, the trace function can be incrementally increased from program counter trace only to program counter and data trace along with ASIC and CPU generated data. The real-time data exchange function may also be optionally deployed. The ability to customize on-chip tools, changes the applications development paradigm. Historically, all chip designs with a given CPU core were limited to a fixed set of debug capability. Now, an optimized set of debug capability is available for each chip design. This paradigm change gives system architects the tools needed to manage product development risk at an affordable cost. Note that the same CPU core may be used with differing peripherals with differing pin outs to embody differing system-on-chip products. These differing embodiments may require differing debug and emulation resources. The modularity of this invention permits each such embodiment to include only the necessary debug and emulation resources for the particular system-on-chip application.

The real-time emulation debug infrastructure component is used to tackle basic debug and instrumentation operations related to application development. It contains all execution control and register visibility capabilities and a minimal set of real-time data exchange and analysis such as breakpoint and watchpoint capabilities. These debug operations use on-chip hardware facilities to control the execution of the application and gain access to registers and memory. Some of the debug operations which may be supported by real-time emulation are: setting a software breakpoint and observing the machine state at that point; single step code advance to observe exact instruction by instruction decision making; detecting a spurious write to a known memory location; and viewing and changing memory and peripheral registers.

Real-time emulation facilities are incorporated into a CPU mega-module and are woven into the fabric of CPU core 201. This assures designs using CPU core 201 have sufficient debug facilities to support debugger application program 110 baseline debug, instrumentation, and data transfer capabilities. Each CPU core 201 incorporates a baseline set of emulation capabilities. These capabilities include but are not limited to: execution control such as run, single instruction step, halt and free run; displaying and modifying registers and memory; breakpoints including software and minimal hardware program breakpoints; and watchpoints including minimal hardware data breakpoints.

The execution control facilities offer two modes of operation, stop mode and real-time. These modes differ as to how CPU core 201 handles maskable interrupts, non-maskable interrupts, and reset after code execution is halted. The halt of code execution can be caused by the user from debugger application program 110 via a keyboard or mouse input, via a software breakpoint or via a hardware breakpoint or watchpoint. All interrupts and resets are disabled at this point when operating in stop mode. In the real-time mode, reset and non-maskable interrupts (NMI) can always be serviced along with those maskable interrupts designated as real-time events. The real-time facilities are implemented without the assistance of a monitor program for CPU cores 201 with pipelines that allow an interrupt between each instruction. A monitor program is required to support real-time operation for those pipelines that do not meet the interrupt between each instruction criteria.

The real-time aspects of this capability provides for the execution of interrupt driven code while the execution of background code is stopped to perform debug operations. Facilities are provided to define each interrupt as either a real-time or a non-real-time event. Interrupts defined as real-time events are continually serviced, even while the debug of background code occurs. Interrupts defined as non-real-time events can be serviced as long as the debug facilities have not stopped the application. The real-time execution of the time critical code is thus transparent to the developer.

The registers of CPU core 201 are viewed when the application has been halted. The register view corresponds to the machine state at the stop point. The debug software and hardware assure that the register activity that occurs as a result of real-time interrupts is transparent to the user. All register changes affect only registers values relative to the stop point. Memory is also displayed and changed relative to the stop point. Alternately, memory may be viewed and changed independent of whether a stop point has occurred. Debug related memory accesses can be constrained to bus cycles where CPU core 201 has not created a memory access. This makes debug related accesses transparent to the application when the these accesses target zero wait state memory.

A shared hardware component provides two hardware breakpoints, an address and data watchpoint or low bandwidth real-time data exchange capabilities. This hardware block also provides a parallel signature analysis function in some implementations. The hardware breakpoints provide a means for setting breakpoints in ROM. The watchpoint provides for the detection of memory read and writes of specific data patterns to an address.

Baseline and extended debug capabilities may be customized on-chip for each instance of the system-on-chip. This requires flexibility in the debug software. When the debug system is initialized, a chip identity code is read from the device. Debugger application program 110 uses this identity code to locate a file that identifies the debug building blocks of the corresponding chip. The file data provides information to automatically configure debug application program 110 to display any enabled capabilities of target device 140 to the user.

Since interaction with system resources can alter the timing of real-time systems, debugger application program 110 takes special care not to touch system resources without being directed to do so. At startup and thereafter, debugger application program 110 does not therefore access machine resources unless a user action dictates these accesses. This minimizes the opportunity to create unwanted system disturbances Debugger application program 110 presents the machine state when the application program halts. When the execution mode is stop mode, the application program can be halted after each instruction. Functions such as step, breakpoints or the like, cause the application to halt immediately. There are no dependencies on the CPU pipeline, with a step advancing the pipeline one instruction. For real-time mode, the model for execution control remains identical to that for stop mode for CPUs that can take an interrupt after every instruction.

When the execution mode is real time, the visualization of the execution control changes substantially for CPU cores 201 that cannot take an interrupt after every instruction. An example of such a CPU core is the Texas Instruments TMS320C6000 with an unprotected pipeline. For this CPU class, the application program can only be halted at interruptible points in the program. This is true for breakpoints, watchpoints and single instruction steps. For this CPU class, a step operation starts execution and execution does not stop until it reaches an interruptible point. This means the number of instructions executed by the step may be one or more and perhaps many more than one. Any breakpoint or watchpoint request asserted will only cause the halt of the application program when interrupts are enabled. This halt of program activity could be many states after a halt request is asserted.

Real-time execution control allows interrupt code execution to occur while background code has been halted. A breakpoint or other halt condition can occur in this interrupt code after background code execution was previously halted. In this case, multiple stops are outstanding at the same time. Each stop creates a debug frame, with debug frames being stacked. Execution must be restarted from the most recently generated debug frame before execution of any prior frames can be restarted. The ability to flush all debug frames is provided.

Visibility into the on-chip program and data activity is the key to efficient debug. Providing this visibility involves on-chip facilities for data collection, export of the collected data and control over the collection mechanism. An external recording device such as a logic analyzer or emulator stores the exported data. The recording device forwards to debugger application program 110 upon request for post processing and display. Components of debugger application program 110 use the processed trace data to provide the visibility needed for a number of debug, quality assurance and optimization operations related to application development. Some of the development processes that use trace are: run away code debug; memory corruption debug; general observation of program flow and decision making; monitoring application specific integrated circuit (ASIC) components and peripheral operations; observing input and/or output data streams; instruction code coverage and path coverage; and program profiling and bus or memory profiling.

Each trace channel can export up to four types of information. These four types are: program flow or program counter trace with timing; reads and writes to memory and peripherals; ASIC data or other activity; and data provided by the application software. Table 1 identifies the trace information types needed to quickly address issues related to the development processes listed above.

TABLE 1

| Development Process | Information Type | | | |
|---|---|---|---|---|
| | Program | Memory | ASIC | Application |
| Debug | | | | |
| Run away code | X | | | |
| Memory | X | X | | |
| General trace | X | X | | X |
| ASIC/peripherals | | | X | X |
| Input and/or | | | X | X |
| Quality Assurance | | | | |
| Code coverage | X | | | |
| Path coverage | X | | | |

TABLE 1-continued

| Development Process | Information Type | | | |
|---|---|---|---|---|
| | Program | Memory | ASIC | Application |
| Optimization | | | | |
| Program | X | | | |
| Bus or memory | X | | | |

From one to four channels such trace channels may be activated simultaneously permitting the concurrent tracing of the activity generated by one or more subsystems on a chip. These subsystems could be CPU cores 201 and memory systems, ASIC logic, input or output data streams or other information classes defined by the user. When multiple channels are deployed, the channel export mechanisms can share pins to increase the average transmission efficiency. Generally, pin constraints and other factors limit the number of trace channels on a physical device to four.

The trace function is distributed through the development system architecture. It has three major components: on-chip collection and filtering, compression and export; recording at the emulator or logic analyzer; and interpretation and display at host computer 120 using debugger application program 110 software.

Trace utilizes on-chip hardware to collect and filter, compress, and export on-chip activity to a logic analyzer or emulator. Collection involves identifying the trace data and capturing the trace data into on-chip buffers. Data is buffered and prioritized internally after collection to assure that trace information is exported as quickly and efficiently as possible. Buffer sizes and the number of pins dedicated to exporting trace data are scalable to allow the system designer to help meet system trace speed and volume requirements. The captured data is compressed before it is passed to the export block.

After compression, the data is exported at a programmable or fixed trace port width at a clock rate that may or may not be the same as the CPU core 201 clock rate. The export clock is derived from either CPU core 201 clock or from a local oscillator dedicated to the generation of the export clock. The local oscillator option addresses several issues. As system clock rates increase, it may not be possible to export data at CPU core 201 clock rate. An export clock not derived from CPU clock 201 rate may maximize the export bandwidth. Using an optional local oscillator incurs a small incremental hardware cost in order to maximize the transmission bandwidth of trace pin.

Trace information can be collected in one of three ways. These are: bus snoopers; CPU core collection; and via ASIC specific hardware. Bus snoopers monitor program flow and memory accesses with the appropriate filtering identifying transactions of interest. CPU core collection uses CPU core 201 to collect data as part of application program flow. ASIC logic can either determine its own collection criteria or have collection initiated by a advanced analysis trigger output.

Bus snoopers minimize intrusiveness and are better suited to monitor information in a timing transparent manner. This class of collection does not require application program intervention in any way. In the case of bus snoopers, trace triggers created by advanced analysis logic direct the capture of desired of information in on-chip first-in-first-out (FIFO) buffers where it is subsequently processed for export. The control of bus snooper collection mechanisms by the advanced analysis is called trace filtering. The collection can also be controlled via a memory-mapped register. Debugger application program 110 may optionally allow the application to access this register. Options are provided to allow the trace collection to either stall or discard data when the collection parameters cause the FIFOs to fill faster than they can be emptied. This type of collection mechanism is used to create program flow and timing trace. It is deployed to trace memory references whose origins are not deterministic.

Advanced analysis facilities or components identify what data is to be collected or how much data is to be collected. These facilities are used to start or stop trace acquisition after a sequence of events occurs in the application program or directly select the data that is placed in collection FIFOs. Advanced analysis also provides the ability to collect a pre-specified number of bus operations or transactions after the occurrence of an event or define an event that ends the trace session collecting N trace transactions before the system event. These facilities can be used to create a number of additional filtering criteria, with the richness of this criteria set by the strength of the analysis event detection, state machines and counters.

Debugger application program 110 can be used to collect system activity when the data of interest can be observed at a point the applications program. In this case, code is added to the application to collect the desired information and move this information to the trace logic for export. This is approach is actually a hybrid of real-time data exchange and trace where CPU core 201 collects the data which the trace export mechanism exports. This collection and export mechanism provides a high bandwidth output-only application accessible port. This capability can be used simultaneously and in conjunction with the bus snooper capabilities. The applications program collection method targets data collection and is not suited for the collection of program flow and timing information. It is more cost effective than the bus snooper method when used to collect data streams that are related to program flow.

Data generated by ASIC logic or input data streams is presented to the trace export mechanism for inclusion into the trace export stream through a predefined interface. In this collection mechanism, all data FIFOs and data flow control is the responsibility of the ASIC logic. The native form of trace data is compressed before export in order to maximize the amount of information that can be exported for a given trace export bandwidth. The compression operation converts the native information captured on-chip to a format that is, in some cases, heavily compressed. The compressed information must be processed with a sophisticated decompression algorithm to return it to its native form. This decompression operation is performed by debugger application program 110 running on host computer 120 after the trace data is removed from target device 140 and passed to the trace software running on host computer 120.

The key to a cost effective on-chip trace is reducing the amount of data collected for export to a trace recorder. Reducing the data volume reduces the need for trace pins and on-chip buffering. A number of compression, filtering, and encoding strategies are employed to accomplish this objective. These strategies play a significant role in keeping the trace bandwidth requirements in check. A few of the compression and bandwidth preservation techniques used include the following. Providing advanced analysis resources enables user specification of exactly what data is to be exported. Thus data is only collected at the points in the application program of interest. The on-chip facilities on target system 140 collects and exports only program counter discontinuity information. The full program counter flow is reconstructed by debugger application program 110. This reduces the amount of trace data needed to be transferred. Branch or context switch information is not transmitted if it can be inferred from the program source code. High order bits of data values that are the same as the previous values transmitted are not transmitted. Instruction activity indicators are minimized in architectures that permit this minimization.

The export of non-native, compressed information means that triggering and sequence detection at host computer 120 is not practical. Since the trace stream can contain multiple data types, it is also difficult to define the recording of a specific number of samples of one type before and after an event at the recording destination. Consequently, the recorder is treated as a pure recording device, with all event and trace management moved on-chip. Since the trace port bandwidth is a premium, the export mechanism provides for the export of trace information either at the processor clock rate or a rate that is asynchronous to the processor clock rate. The asynchronous export mode allows the trace port transmission rate to be maximized as it can be de-coupled from the processor clock rate. This is significant as is unlikely that the processor clock rate will match the optimum trace export rate in most applications.

Data trace has an immense appetite for export bandwidth. Every effort is made though debug function pin sharing to allocate as many pins to data trace export as practical. Thus the maximum amount of information can be exported without stalling the processor or losing data. The pin sharing option, very efficient compression algorithms, and high transmission rates minimize the number of chip pins needed to be allocated to debug functions.

This invention provides a mix of debug capabilities addressing a number of debug problems. They are a superset of the capabilities provided by the prior generation of debug port offerings. Two new capabilities of high performance real-time data exchange and trace stand out. They have been added to the debug portfolio to maintain visibility in the face of the continuous march to higher clock rates and higher levels of integration. Addressing the visibility problem at an affordable system cost presents a particular challenge to the tools architects and developers. Since debug will have a modest or small pin and gate allocation to constrain system cost, the challenge is to provide historical visibility levels with novel approaches. Maintaining the status quo in this environment would indeed be a major accomplishment.

The debug port is one component of a configurable debug strategy. Traditionally, a single set of debug capabilities was built into each CPU core 201. These capabilities remained constant over the lifetime of CPU core 201, supported by a single set of debugger source code. As the relentless increase of gate densities and clock rates continue, the in system debug problem becomes more complex. Increased levels of integration translate to vanishing visibility. This is a severe problem because it is difficult if not impossible to fix what you cannot see. As systems-on-chip become dominated by large memory structures, the relative cost of debug features in relation to the entire system has shrunk dramatically. Currently where adding more debug capabilities to a custom digital signal processor (cDSP) or mass market device is practical on a chip by chip basis. Customers are prepared to add additional debug capabilities to those standard capabilities incorporated into CPU cores. These additional capabilities are expected to create time to market advantages that justify the additional recurring costs.

In the customer's mind, the customizing of the on-chip debug capabilities ultimately boils down to three questions. First, to what extent will this customization improve my ability to create and produce product? Second, what is the cost of the customization in gates or die area? Third, what is the cost of the customization in pins or package cost? In summary, are the costs of customization worth the benefits? The answer to these questions is not the same for all design teams and all products. Since the complexity of applications varies along with the debug styles of design teams, the need to customize varies by chip. There will be no one answer.

As the vanishing visibility problem illustrated in FIG. 1 intensifies, the customer is facing a dilemma. Today's minimal on-chip capabilities pose a time to market threat. One subtle system problem can introduce weeks of product delivery delay. System designers can't fix it if they can't see it. A strong on-chip tool set is insurance against this happening. The need to strengthen the debug capabilities of a chip receives additional attention when production devices serve as the application debug platform. These production chips must provide sufficient debug capabilities to support time to market objectives yet be cost competitive.

The on-chip debugging requirements are heavily influenced by the debug style of system design teams. It is highly desirable to provide system architects the ability to tailor the on-chip debug facilities to balance time to market and cost needs. The techniques of this invention provide this option. These techniques provide for addition of debug capability to custom digital signal processor (cDSP) and mass market chips via a library of emulation peripherals. The number and type of these peripherals added are tailored to meet the debug requirements defined by the target application. The original semiconductor manufacture's applications teams define the emulation capabilities mix added to mass market chips. The custom digital signal processor customer defines the emulation capabilities added to cDSPs. The scalability aspect of emulation capability makes it feasible to include them in production devices with manageable cost and limited performance overhead.

In this configurable debug/emulation paradigm, the system architect has the option to increase or decrease the pin count allocated to debug functions with a corresponding increase or decrease in the debug capabilities. These include the capability or functions available at any one time, the communication bandwidth, and the trace bandwidth. Since a user will not generally utilize all emulation functions at the same time, it makes sense to dynamically allocate the emulation peripherals and trace/debug pin pool based the debug capability specified by the user at any point during development session. This approach substantially minimizes the pin count pressure created by the addition of emulation capability to a production chip and provides more capability for a lower cost. The pins assigned to trace and debug can be dynamically reallocated to trace, debug or a mix of trace and debug functions. At any one time, the debug pin pool may provide a mix of capabilities related to: debug, such as run, step, read and write registers and memory; trigger channels used to input and output triggers; real-time data exchange for data exchange or data logging; and trace for export of program counter, memory access, or ASIC logic activity. The debug pin pool may dictate the available trace and communication bandwidths, the communication formats used for debug and real-time data exchange and the emulation peripheral functions that can be used simultaneously.

The emulation peripheral functionalities of trace and real-time data exchange are designed permitting a scalable number of pins. More pins allocated to a particular function means more bandwidth for that function. The allocation of more pins to any particular function may come at the expense of reducing the number of pins allocated to a second function, thereby reducing its available bandwidth.

The general rules are simple. The total number of pins allocated cannot exceed the maximum number available. A minimum number of pins must allocated to some functions to enable them. Finally, the addition of the pins to the minimum number required for a function such as debug, trigger, real-time data exchange or trace increases the communication bandwidth for the function. The addition of emulation peripherals to a production chip requires gates and in some cases pins. Only the importing or exporting information to debug and trace facilities external to the production chip generate pin requirements. Since adding pins and gates to production chips can adversely affect system cost, the new paradigm must be scalable. "Pay only for what you need" must be the message to customers. Delivering a debug/emulation tools library must be accompanied by a means to evaluate its capabilities and make the decisions as to its cost/benefits. Gates and pins are not free, just more affordable than they have been in the past.

In the configurable debug paradigm, effective use of gates and pins is a must. Flexible combinations of emulation peripherals provide a cost containment mechanism for gate consumption while an efficient pin reuse strategy offers cost containment for pin consumption. Since there are different debug needs during a product development cycle, the gates and pins dedicated to debug can in many cases be reconfigured at run-time to best address the debug function needed at the moment. This model boosts the return on investment of debug related expenditures. For instance, debug and trace pins are viewed as a single pool of pins that are allocated at run-time. Most pins can be assigned one or more different debug functions during a debug session. A single pin could be assigned trace, trigger, communication, or other functionality at any one time. Generally all pins that are not assigned to another function are assigned to trace as this maximizes the available trace bandwidth. The reconfiguration theme is also followed with debug gates, with many on-chip modules capable of delivering several functions. In this case the on-chip modules are also configured at run-time. This model does not preclude fixed pin or module functions.

Figure 4:
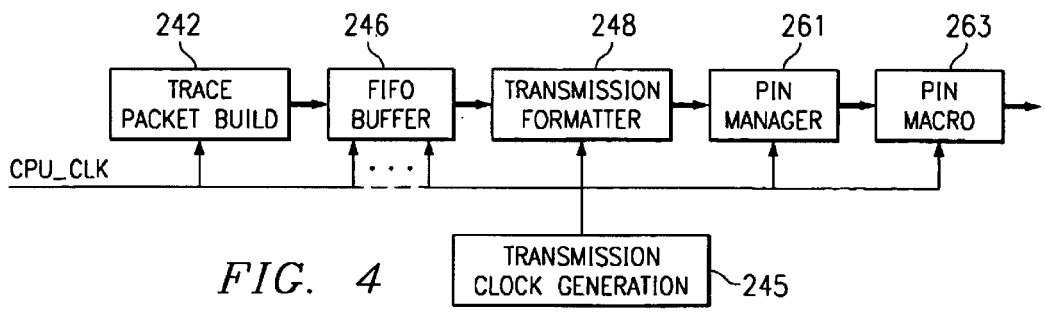
FIG. 4 illustrates the final trace output stages.

FIG. 4 illustrates the final trace output stages. Trace export 240 includes trace packet build 242, first-in-first-out (FIFO) buffer 246 and transmission formatter 248. Pin manager and pin macros 260 includes pin manager 261 and pin macros 262. As illustrated in FIG. 4, trace packet built 242 and the input stage to FIFO buffer 246 are clocked by CPU_CLK, which is employed by CPU core 201. The output stage of FIFO buffer 246 as well as transmission formatter 248, pin manager 261 and pin macros 262 are optionally clocked by either CPU_CLK or by a different clock signal from transmission clock generator 245 (called local oscillator 245 in FIG. 3). Transmission clock generator 245 is generic to all instruction set architectures (ISAs) and reused of the implementation is expected.

FIFO buffer 246 is either: asynchronous to CPU_CLK clock; synchronous to CPU_CLK; or not needed. When FIFO buffer 246 is asynchronous to CPU_CLK, the trace port is fixed or variable width and the transmission is at a rate other than CPU_CLK. During asynchronous operation, the input interface of FIFO buffer 246 operates with at the CPU_CLK and the output interface of FIFO buffer 246 operates at the transmission clock of transmission clock generator 245. FIFO buffer 246 operates as an asynchronous FIFO buffer between trace packet build 242 and transmission formatter 248. When FIFO buffer 246 is synchronous to CPU_CLK, the trace port is fixed or variable width and the transmission is at the rate of CPU_CLK. Synchronous operation is similar to asynchronous operation, only the transmission clock and functional clock (CPU_CLK) are the same. A trace packet and port width mismatch requires FIFO buffer 246 between trace packet build 242 and transmission formatter 248 to act as a synchronous FIFO buffer. FIFO buffer 246 is not needed when the trace port is fixed at 10 bits and the transmission is at the rate of CPU_CLK.

Local oscillator 245 is deployed to optimize the transmission rate of the trace port. Local oscillator 245 allows the trace port clock to be generated at the maximum trace port rate independent of the processor clock rate, there by maximizing the trace port bandwidth. Local oscillator 245 provides: clock generation in a range of 125 MHZ to 250 MHZ or higher over the manufacturing process; measurement of the oscillator clock OCK frequency; measurement of the functional clock FCK frequency; creation of the oscillator clock OCK using either functional clock FCK or reference clock TCK as a reference; calibration of local oscillator 245 for setup purposes; and functional testing of local oscillator 245. Local oscillator 245 is a Pseudo Digital Frequency Synthesizer (PDFS).

The local oscillator clock OCK is created from a ring oscillator where the length of the ring is varied to change the frequency. The practical range of the local oscillator clock OCK is set by the ring oscillator minimum and maximum frequencies. The ring oscillator frequency range is set to deliver a 125 MHZ to 250 MHZ or higher clock over the entire manufacturing process.

Scale factors that require the generation of a local oscillator clock OCK frequency less than the lowest ring oscillator frequency create the lowest ring oscillator frequency. Scale factors that require the generation of a local oscillator clock OCK frequency less than the fastest ring oscillator minimum frequency create the fastest ring oscillator frequency. Scale factors requesting the generation a frequency between the ring oscillator maximum and minimum local oscillator frequencies generate a local oscillator clock OCK at or near the requested frequency. Since the ring oscillator delay line has finite increments, the oscillator frequency generation increases or decreases in discrete steps that can vary the period of the local oscillator clock OCK approximately two NAND gate delays or about 60 to 200 picoseconds depending on the process node. This is equivalent to between 1.5 and 3% at roughly 200 MHZ.

When the oscillator circuit has locked to the reference, it will seek between two discrete frequencies that vary in period by the delay introduced by one variable delay line element. This is extremely attractive as it distributes trace port EMI/RFI between two different frequencies. There is no requirement to maintain phase relationship between the reference clock and the oscillator clock.

Figure 5:
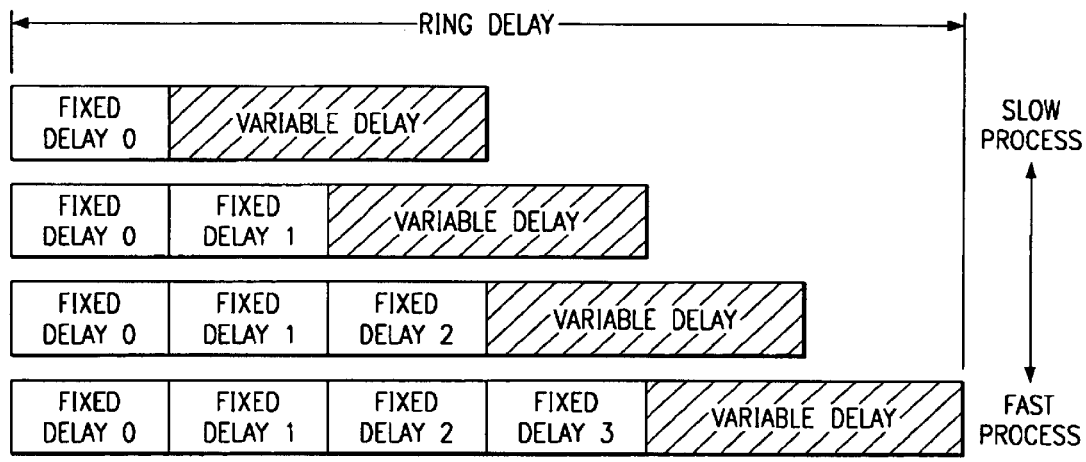
FIG. 5 illustrates the combination of fixed delays and variable delay used in the ring oscillator of this invention.
Figure 6:
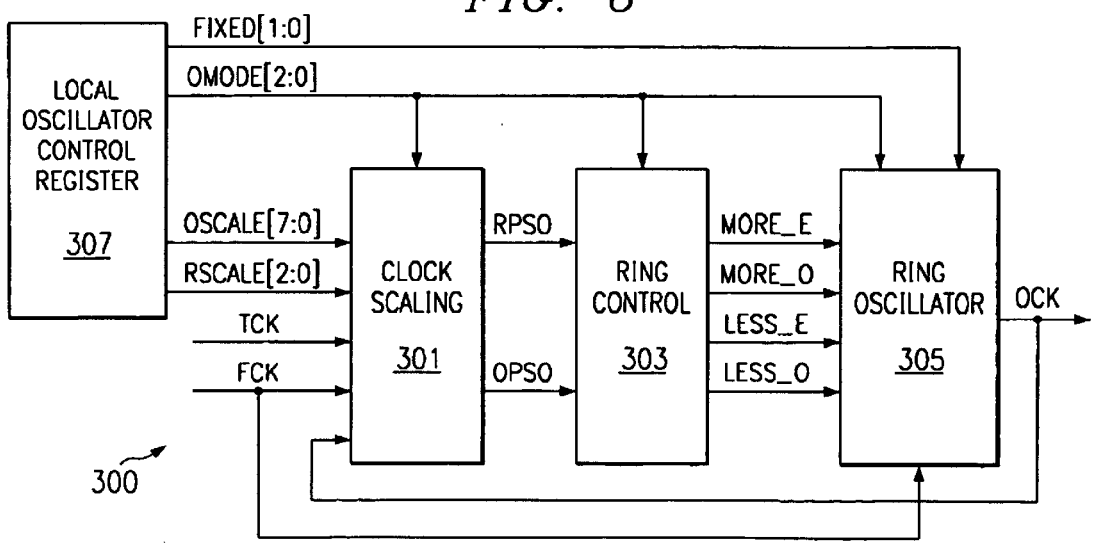
FIG. 6 illustrates the construction of the local oscillator of this invention.

Local oscillator 300, shown in FIG. 6, includes three separate sections: clock scaling 301; ring oscillator control 303; and ring oscillator 305. These elements are all controlled by local oscillator control register 307 in a manner that will be described below. As illustrated in FIG. 5, local oscillator 300 adjusts frequency using one to four fixed delays and a variable delay. This will be explained below.

Figure 7:
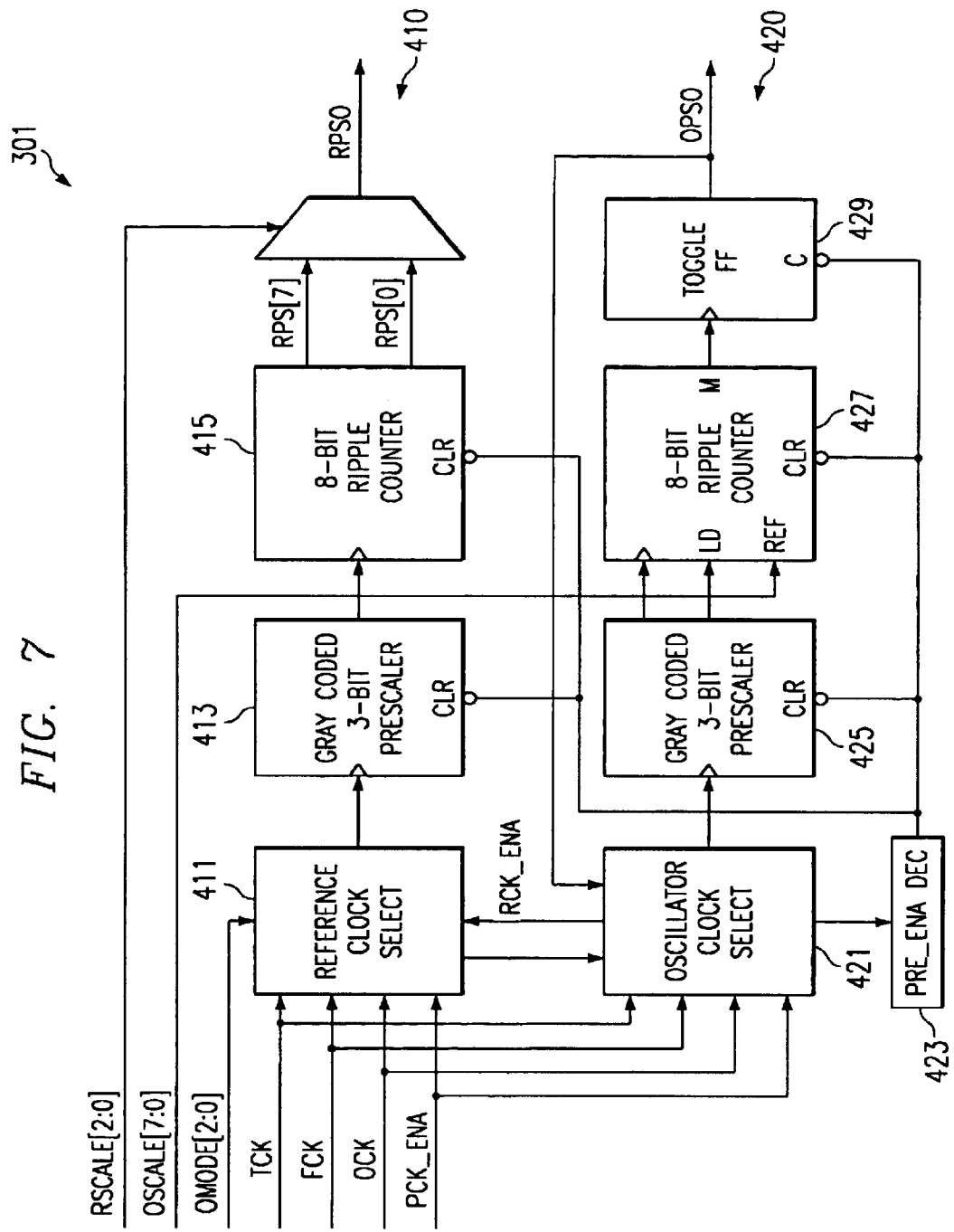
FIG. 7 illustrates details of the construction of the clock scaling block illustrated in FIG. 6.

FIG. 7 illustrates clock scaling 301 in detail. Clock scaling 301 sets the ratio of the selected reference clock and oscillator clock OCK. It contains two pre-scaling sections, the reference clock pre-scaler 410 and the oscillator clock pre-scaler 420. In normal modes, either test clock TCK or functional clock FCK is selected by reference clock select 411 to drive reference clock pre-scaler 410 while oscillator clock OCK is selected by oscillator clock select 421 to drive oscillator clock pre-scaler 420. When the frequency requested is within the oscillator range, OCK locks to the reference and the output frequency of the two pre-scalers is virtually the same. When an out of range frequency is requested, OCK becomes either the lowest or highest oscillator frequency. In this case reference and oscillator pre-scaler outputs do not converge and are never virtually the same.

Ring control 303 determines whether the reference or oscillator input is running a higher frequency and makes the adjustments necessary to add or subtract delay stages in the ring oscillator 305. Ring control 303 compares the number of edges generated by reference pre-scalar output RPSO and oscillator pre-scaler output OPSO. When reference clock pre-scaler 410 generates edges at a higher rate than oscillator clock pre-scaler 420, the oscillator frequency is raised. When oscillator clock pre-scaler 420 generates edges at a higher rate than reference clock pre-scaler 410, the oscillator frequency is lowered. Ring control 303 adjusts the length of the ring oscillator delay chain to cause a change in the oscillator frequency.

Ring oscillator 305 is a combination of a fixed delay line and a variable length delay line that is fed back on itself with an inversion. The fixed delay establishes the maximum oscillator frequency as shown in FIG. 5, while the variable delay provides lowering the oscillator from the maximum. There are four sections of fixed delay. They can be added in series to create one of four fixed delays, as shown in FIG. 5. Fixed delay sections that are not included in the ring delay are disabled so they do not consume power.

Debugger application program 110 uses the calibration capabilities of the local oscillator ascertain the delay value of each of the fixed sections. It then chooses the combination the fixed delays that when added to half the variable delay, creates an oscillator clock that is closest to the desired frequency. This creates the maximum dynamic range for the oscillator thereby giving it the most immunity from temperature and voltage variations. One of four fixed delay combinations can be chosen to establish the maximum frequency. The variable delay section provides a delay twice that of a fixed delay section. Ring control 303 sets the variable delay line length using the criteria discussed previously.

Ring oscillator 305 must be calibrated before the fixed delay option is chosen. Debugger application program 110 establishes the fixed and variable delay values using calibration capabilities built into the local oscillator. This calibration information is then used to choose a fixed delay for normal operation. Calibration involves counting the number of oscillator clocks (OCK) or functional clocks (FCK) that occur within a measurement period defined by a preset number of test clocks (TCK). The measurement period is a window created by a number of test clocks between 8*n where n ranges from 1 to 256, i.e. the clock number ranges from 8 to 2048. Using this measurement requires a minimum TCK frequency of 1 MHz. The fixed delay selection and calibration modes are controlled through local oscillator control register LOSC_CNTL 307.

Local oscillator control register 307 stored data decoded as defined in Tables 2 and 3. These define the characteristics of the local oscillator. Local oscillator control register 307 sets the reference clock pre-scaling, the oscillator clock pre-scaling and the operating modes of calibration, test, and normal. This register is part of the trace port register set and is preferably addresses at base address plus three of the trace port register set.

The eight bits of the OSCALE field corresponding to bits 8 to 15 of local oscillator control register 307 define the local oscillator pre-scale divide factor. The eight bits define a divide ratio of 1 to 256 as shown in Table 2. The three bits of the RSCALE field corresponding to bits 5 to 7 of local oscillator control register 307 define the reference oscillator pre-scale divide factor. The three bits define a ration of 2, 4, 8 to 256 as shown in Table 2. The two bits of the FIXED field corresponding to bits 3 and 4 of local oscillator control register 307 define the number of fixed delays used by ring oscillator 305. These two bits select one, two, three or all four fixed delay elements as shown in Table 2.

TABLE 2

| Name | Bit Field | Description |
| --- | --- | --- |
| OSCALE[7:0] | 15:08 | Oscillator Scale □ LCK divide by<br>0xFF □ Divide by 255<br>0xFE □ Divide by 255<br>0xFD □ Divide by 254<br>. . .<br>0x02 □ Divide by 2<br>0x01 □ Divide by 1<br>0x00 □ Divide by 256 |
| RSCALE[2:0] | 7:5 | Reference Scale □ FCK/TCK divide by:<br>000 □ Divide Pre-scaler by 2<br>001 □ Divide Pre-scaler by 4<br>010 □ Divide Pre-scaler by 8<br>011 □ Divide Pre-scaler by 16<br>100 □ Divide Pre-scaler by 32<br>101 □ Divide Pre-scaler by 64<br>110 □ Divide Pre-scaler by 128<br>111 □ Divide Pre-scaler by 256 |
| FIXED[1:0] | 4:3 | Fixed Delay Select<br>00 □ 1 lumped delay<br>01 □ 2 lumped delays<br>10 □ 3 lumped delays<br>11 □ 4 lumped delays |

These factors result in an oscillator clock OCK frequency given by:

$$OCK = 2*(n/2^{(7-m)})*RCK$$

where: n is an integer that can range from 1 to 256 as selected by the OSCALE field; m is an integer that can range from 0 to 7 and selected by the RSCALE field; and RCK is the reference clock either test clock TCK or functional clock FCK as selected by reference clock select 411. The outputs of reference clock pre-scaler 410 and oscillator clock pre-scaler 420 supply ring control 303 to determine local oscillator frequency adjusts. Dynamically changing one or both of these values while the oscillator is active can cause the period of the oscillator to change no more than attributable to one delay element (1 to 2% maximum before the change takes effect). The FIXED field selects the lumped delay of ring oscillator 305. This field cannot be dynamically changed while the local oscillator is running.

The OMODE[2:0] field corresponding to bits 0 to 2 of local oscillator control register 307 determines the clock inputs to reference clock pre-scaler 410 and oscillator clock pre-scaler 420 as shown in Table 3. This field also determines whether the pre-scalers 410 and 420 operate in calibration, test, or normal modes. This field cannot be changed dynamically while the oscillator is running in normal modes except for selecting the reference clock following initialization by moving between state 000 and state 001 or moving between state 000 and state 010.

TABLE 3

| OMODE [2:0] | Mode | RPS Clk | OPS Clk | Mode |
|---|---|---|---|---|
| 000 | Normal | OFF | OFF | Oscillator and pre-scalers off and initialized |
| 001 | Normal | FCK | OCK | Oscillator with TCK reference |
| 010 | Normal | TCK | OCK | Oscillator with FCK reference |
| 011 | Test | OCK | OCK | Use to test comparison state machine, and variable delay line |
| 100 | Calibrate | OFF | OFF | Pre-scalers initialized |
| 101 | Calibrate | FCK | TCK | Stop pre-scalers on osc. pre-scaler carry, more |
| 110 | Calibrate | OCK | TOK | Stop pre-scalers on osc. pre-scaler carry, less |
| 111 | Calibrate | OCK | TCK | Stop pre-scalers on osc. pre-scaler carry, more |

The operation of these modes is described below.

FIG. 7 illustrates clock scaling 301. There are two major sections, the reference clock pre-scaler 410 and the oscillator clock pre-scaler 420. In normal operation the two sections operate separately to generate scaled versions of reference and oscillator clocks. These scaled clocks are sent to the ring control 303 for processing.

The clock circuit has 3 normal modes and 2 test modes. The three normal modes are: local oscillator output disabled; local oscillator output generated based on test clock TCK reference; and local oscillator output generated based on function clock FCK reference. The test modes are: local oscillator clock OCK input to both reference and oscillator pre-scaling sections; and frequency measurement mode.

Clock scaling 301 includes a 3-bit ripple pre-scaler 413 on the input of the reference clock channel and a 3-bit ripple pre-scaler 425 on the input of the oscillator clock channel. Reference channel 3-bit pre-scaler 413 is followed by 8-bit ripple counter 415. Oscillator channel 3-bit pre-scaler 425 is followed by 8-bit ripple counter 427. The respective 3-bit pre-scalers 413 and 425 reduce the input clock rate to a frequency that is easily manageable. The length of the pre-scalers is chosen to support test clock TCK reference frequencies as low as 1 MHZ. Oscillator 3-bit pre-scaler 425 creates ripple counter clock and load functions roughly four input clocks apart. In normal mode 000 selected by he OMODE field, pre-enable decode 423 clears all pre-scaler stages (413, 415, 425, 427, 429) to zero.

When oscillator clock pre-scaler 425 reaches an all ones count, ripple counter 427 is loaded with the OSCALE value prior to the next count directive. Oscillator clock pre-scaler 425 provides its count and load signals by approximately four input clocks enabling this load.

The normal modes either disable local oscillator 245 or create a local oscillator output that based on either function clock FCK or test clock TCK. These modes encompass OMODE codes 000, 001, and 010. The test modes provide for the testing of local oscillator 245, causing OCK to source both the reference clock pre-scalar 410 and oscillator clock pre-scaler 420. Clock scaling 301 is functionally tested in this mode by manipulating the multiplier portion of the frequency synthesis equation.

When the OMODE field is 000, the local oscillator circuits are initialized. Initialization asynchronously clears the reference clock pre-scaler 410 and oscillator clock pre-scalar 420, asynchronously clears the variable delay line element pointer, and turns ring oscillator 305 off. Local oscillator 245 is completely disabled in this mode. When the OMODE field is set to 001 or 010, local oscillator 245 begins normal clock generation. The input to reference clock pre-scaler scaler 410 is set to test clock TCK if OMODE is 001 and set to function clock FCK if OMODE is 010. In either case the input to oscillator clock pre-scaler 420 set to OCK. Ring control 303 is released to operate and OCK is enabled. At some point afterward, the circuit reaches equilibrium with OCK the specified multiple of the selected reference.

When the OMODE field is 011, OCK drives both the reference clock pre-scaler 410 and oscillator clock pre-scaler 420. The pre-scalers are tested in this mode. When the $2*(n/2^{(7-m)})$ portion of the reference equation resolves to 1, the outputs of reference clock pre-scaler 410 and oscillator clock pre-scaler 420 virtually match. In this case ring control 303 does not alter the delay setting more than one delay from its initial setting since the equilibrium condition is reached. This equilibrium condition occurs because the pre-scalers are driven from the same clock. In this case, the delay element position remains constant or oscillates by one. This can be used to assure each bit of both pre-scalers is functional. If the equation resolves to >1, ring control 303 continuously requests the oscillator to speed up. Conversely, if the equation resolves to <1, ring control 303 directs the oscillator to continuously slow down. In both of these cases OCK is changed but the attempt to reach equilibrium are futile as both the pre-scalers are driven from OCK. The results of these operations can be observed by reading local oscillator control register 307 and observing the delay selection field. This mechanism provides a test mechanism for of each bit of both pre-scalers.

When OMODE is set 100 to 111, local oscillator 245 operates in calibration mode. An OMODE code of 100 clears reference clock pre-scaler 410 and oscillator clock pre-scalar 420, and clears a state machine that monitors the relationship between the reference clock pre-scaler 410 and oscillator clock pre-scaler 420 outputs without altering the variable delay setting. Codes 101 to 111 enable reference clock pre-scaler 410 and oscillator clock pre-scaler 420 to count. When oscillator clock pre-scaler 420 count reaches all ones, the counts of reference clock pre-scaler 410 and oscillator clock pre-scaler 420 are frozen. They remain frozen until a code is applied other than 101 to 111. When the freeze happens, ring control 303 either lengthens or shortens the variable delay and waits for the pre-scalers to be cleared and the clear removed before reapplying pre-scaler clocks. The OMODE setting is applied to local oscillator 245 in sufficient time before clocks are enabled so that the circuit operates properly. Code 101 measures functional clock FCK. Code 110 measures oscillator clock OCK frequency and shortens the variable delay line thus increasing the oscillator clock OCK frequency after the measurement is taken. Code 111 measures oscillator clock OCK frequency and lengthens the variable delay line decreasing the oscillator OCK frequency after the measurement is taken.

A typical OMODE code application sequence for calibration is as follows:

Functional clock FCK Measurement:

000 ☐ Initialize the local oscillator

100 ☐ Initialize the local oscillator

101 ☐ Measure functional clock FCK

Read control register until 8 duplicate values other than zero to ascertain completion Oscillator clock OCK Measurement: From fastest to slowest 000 ☐ Initialize the local oscillator
100 ☐ Initialize the pre-scalers
111 ☐ Measure oscillator clock OCK with variable delay 0

Read control register until 8 duplicate values other than zero to ascertain completion 000 ☐ Initialize the local oscillator
100 ☐ Initialize the pre-scalers
111 ☐ Measure oscillator clock OCK with variable delay 1

Read control register until 8 duplicate values other than zero to ascertain completion 000 ☐ Initialize the local oscillator
100 ☐ Initialize the pre-scalers
111 ☐ Measure oscillator clock OCK with variable delay n Read control register until 8 duplicate values other than zero to ascertain completion 000 ☐ Initialize the local oscillator
100 ☐ Initialize the pre-scalers
111 ☐ Measure oscillator clock OCK with variable delay n+1

Read control register until 8 duplicate values other than zero to ascertain completion Repeat until maximum variable delay reached.

A similar sequence can be used to measure the oscillator clock OCK frequency from slowest to fastest by starting from the end of the last sequence. In this case, the second OMODE code is 110, which decreases the variable delay each cycle.

The reference clock pre-scaler 410, shown in the upper half of FIG. 7, is simply an 11-bit ripple counter. It is divided into 3-bit pre-scaler 413 and 8 bit ripple counter 415. Both 3-bit pre-scaler 413 and 8 bit ripple counter 415 are cleared when the pre-enable signal PRE_ENA is a zero. The output of each stage of 8 bit ripple counter 415 (RPS[0] to RPS[7]) is output to multiplexer 417. Multiplexer 417 selects one of these outputs RPS[0] to RPS[7] as the reference pre-scaler output (RPSO) according to the value of the RSCALE field of local oscillator control register 307. This allows reference clock pre-scaler 410 to vary the reference pre-scaler output by $8*2^{(7-m)}$, where m can range from 0 to 7.

Oscillator clock pre-scalar 420 is slightly more complex than reference clock pre-scalar 410. Oscillator clock pre-scaler 420 has a reloadable 8 bit ripple counter 427 along with 3-bit pre-scaler 425. The clock input of 8 bit ripple counter 427 is fed by 3-bit pre-scaler 425. The least two significant bits of 3-bit pre-scaler 425 are preferably gray coded. Ring control 303 enables the reference clock pre-scaler 410 and oscillator clock pre-scaler 420 clocks via a clock enable signal CKENA. These clocks are enabled asynchronously. Once a pre-scaler clock is enabled the corresponding pre-scaler begins to advance. Ring control 303 starts ring oscillator 305 at its fastest frequency after PRE_ENA is are all ones. After pre-enable decoder 423 releases PRE_ENA, 8-bit ripple counter 427 is loaded with the local oscillator scale value (OSCALE[7:0]). Following this load 8 bit ripple counter 427 has the correct value and is ready to count. The 8 bit ripple counter 427 begins to count when the most significant bit of 3-bit pre-scaler 425 goes to one and then to zero. The 8 bit ripple counter 427 reloads following count to all 0's. This continues indefinitely unless calibration mode is specified.

Ring control 303 does not treat the OPSO and RPSO inputs the same. Ring control 303 processes positive edges on the OPSO and both edges on the RPSO. This gives the OPSO an extra divide by two. Toggle flip-flop 429 at the output oscillator clock pre-scaler 420 provides another divide by two. Table 4 lists the total count implemented for various inputs of RSCALE and OSCALE.

TABLE 4

| Divide By | RSCALE [2:0] | OSCALE [7:0] |
|---|---|---|
| 8 | 000 | — |
| 16 | 001 | 00000000 |
| 32 | 010 | 00000001 |
| 64 | 011 | 00000011 |
| 128 | 100 | 00000111 |
| 256 | 101 | 00001111 |
| 512 | 110 | 00011111 |
| 1024 | 111 | 00111111 |
| 2048 | — | 01111111 |
| 4096 | — | 11111111 |

Both the RPSO and OPSO signals are readable through the local oscillator control register LOSC_CNTL.

When local oscillator 245 is operating in functional modes, RPSO and OPSO control the oscillator rate. If OPSO has two rising edges before the RPSO has either a falling or rising edge, ring control 303 directs ring oscillator 305 slow down. If RPSO has rising and falling (or falling and rising) edges before OPSO has a rising edge, ring control 303 directs ring oscillator 305 to speed up.

Figure 8:
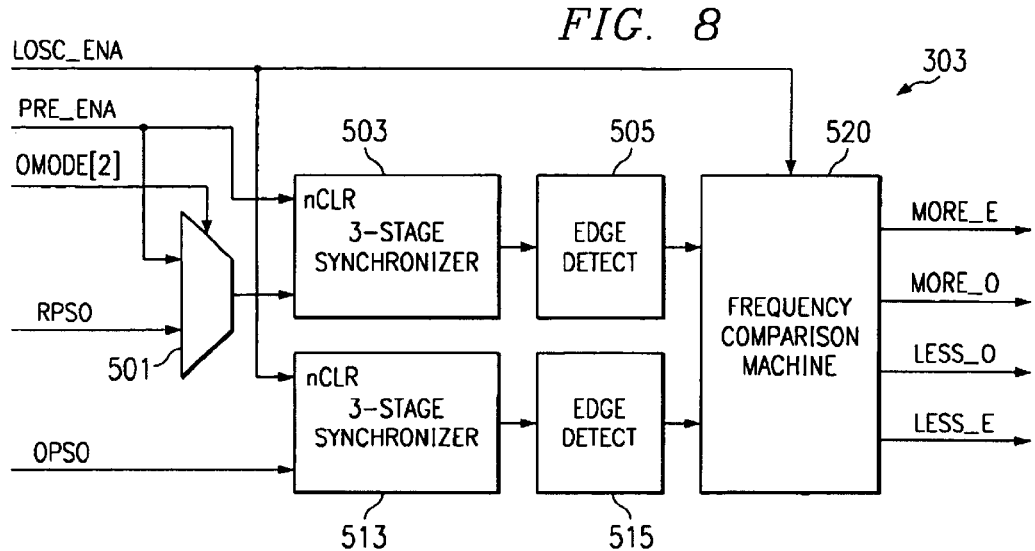
FIG. 8 illustrates the details of the construction of the ring control block illustrated in FIG. 6.

FIG. 8 illustrates the details of ring control 303. Ring control 303 includes input multiplexer 501, 3-stage synchronizer 503, edge detector 505, 3-stage synchronizer 513, edge detector 515 and frequency comparison state machine 520. Ring control 303 has two operating modes, a first mode for normal and test operation and a second mode for calibration selected by the most significant bit of the OMODE field (see Table 3). In normal/test operation, ring control 303 receives the oscillator pre-scaler output OPSO and reference pre-scaler output RPSO from the clock scaling 301. Input multiplexer 501 selects the reference pre-scaler output RPSO. The pre-scaler enable signal PRE_ENA clears 3-stage synchronizer 503. Similarly, the local oscillator enable signal LOSC_ENA clears 3-stage synchronizer 513. Edge detector 505 detects both the rising and falling edges of its input from 3-stage synchronizer 503. Edge detector 515 detects only rising edges of its input from 3-stage synchronizer 513. Ring control 303 compares the rate to the RPSO and OPSO inputs in frequency comparison state machine 520 to determine which is faster. Frequency comparison state machine 520 compares the rate of rising edges on OPSO to the rate of rising and falling edges on RPSO. Ring control 303 adjusts the oscillator frequency to make the OPSO rate twice the rate of RPSO. Ring control 303 directs ring oscillator 305 to add more or less delay in the ring. There are separate directives for even and odd delay element cells. Thus frequency comparison state machine 520 has four output signals: more delay even element signal MORE_E; more delay odd element signal MORE_O; less delay odd element signal LESS_O; and less delay even element signal LESS_E. This allows the storage elements determining the ring length to act similar to master-slave flip-flops, with even cells and odd cells being updated by different clocks. When the ring delay is lengthened on consecutive adjustments, the MORE_E and MORE_O signals alternate. When the ring delay is shortened on consecutive adjustments, the LESS_E and LESS_O signals alternate. When the ring delay is lengthened and then shortened or shortened and lengthened on consecutive adjustments, the adjustments are made with both targeting even cells or both targeting odd cells.

In calibration mode, the control register can be used to step the ring oscillator adjustments up or down. In this mode, input multiplexer 501 selects the pre-scaler enable signal PRE_ENA. The pre-scaler enable signal PRE_ENA is used to signal ring control 303 that calibration is enabled. A calibration sequence starts with the initialization of the local oscillator. This clears reference clock pre-scaler 410, and loads the oscillator clock pre-scaler 420. The pre-scaler clocks are enabled when pre-scale enable signal PRE_ENA becomes 1. Pre-scalers 410 and 420 count until oscillator clock pre-scaler 420 reaches all ones. At this point the clocks to both the reference and oscillator pre-scalers are shut off. This sets the OPSO a one. This one is detected by the ring control 303. Ring control 303 then waits until software reads the reference pre-scaler value. After the read, reference clock pre-scaler 410 and oscillator clock pre-scaler 420 are initialized again when pre-scaler enable signal PRE_ENA becomes 0. This is achieved by writing to local oscillator control register 307 to set the OMODE to 100 followed by another write to set the OMODE field to another calibration mode (101, 110 or 111). Ring control 303 detects this action by detecting an OPSO value of zero and a pre-scaler enable signal PRE_ENA value of one. At this point, ring control 303 uses the least significant bit of the OMODE field, bit 0, to determine whether to increase or decrease the ring delay (see Table 3). After adjusting the ring delay, the ring control 303 turns on the pre-scaler clocks and a new calibration cycle begins.

When local oscillator 245 is initialized with local oscillator enable signal LOSC_ENA as 0, the MORE_E and MORE_O signals are asserted simultaneously. This sets the ring delay to its maximum causing local oscillator 245 to begin from its slowest frequency as defined by the fixed delay selected and variable delay.

Figure 9:
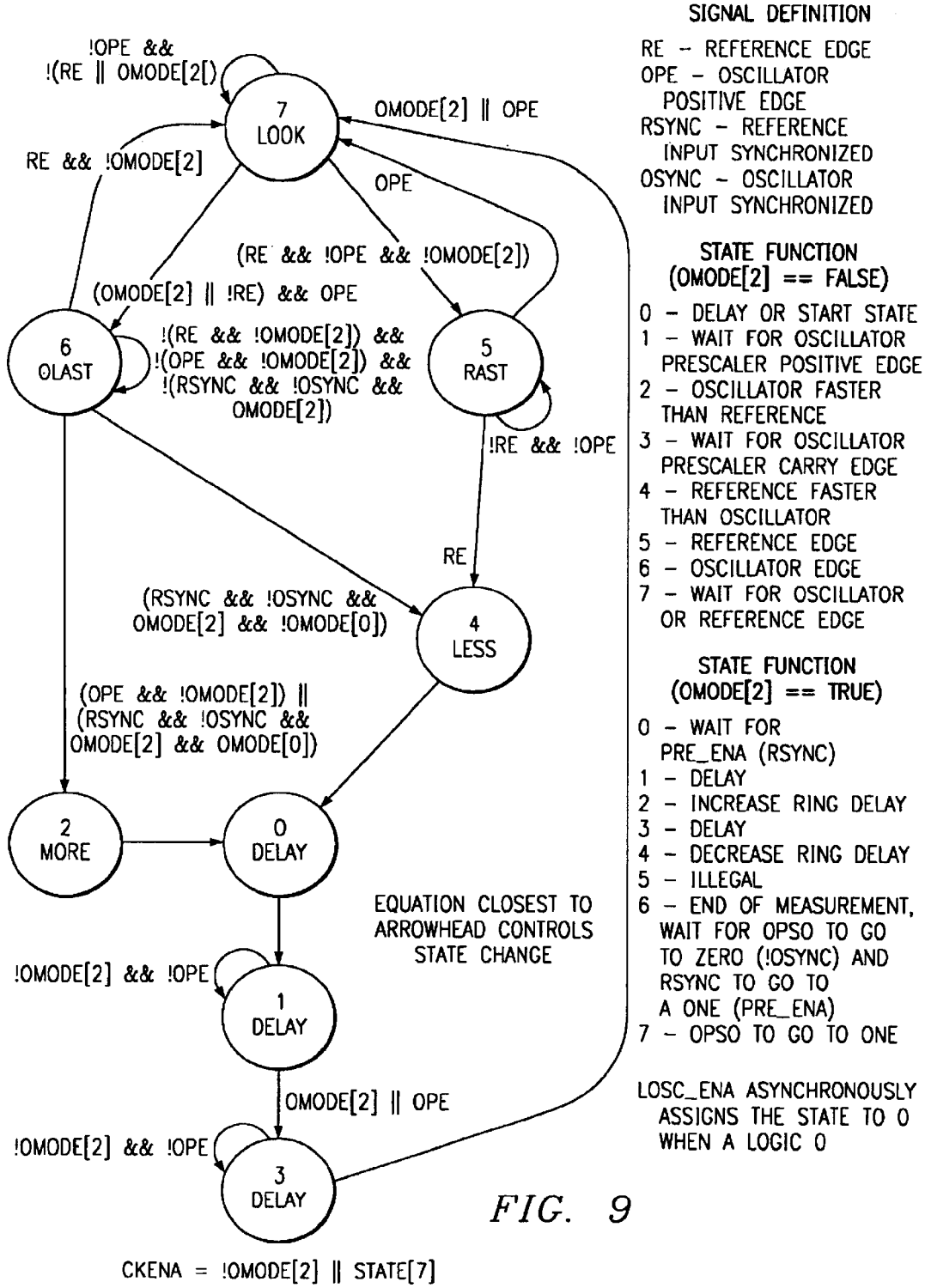
FIG. 9 illustrates the state transitions of the state machine of the frequency comparison machine illustrated in FIG. 8.

FIG. 9 illustrates the states of frequency comparison state machine 520. These states are gray coded so that all state transitions change only a single bit in the state encoding. This frequency comparison state machine 520 manages ring oscillator 305 by controlling the variable delay line length. The frequency comparison state machine 520 operates in two modes as defined by the local oscillator control register 307: a normal/test mode; and a calibration mode. Switching between these two modes is only permitted to an from when local oscillator enable signal LOSC_ENA is 0 at the beginning or end of the mode change.

There are three functions performed by frequency comparison state machine 520 in normal/test mode: wait for effects of update; frequency comparison; and position counter update. The wait states are states 0, 1, and 3. Frequency comparison machine 520 is asynchronously set to state 0 when local oscillator enable signal LOSC_ENA is 0. This state is just an initial delay state with no action during normal operation except waiting on the local oscillator enable signal LOSC_ENA. When local oscillator enable signal LOSC_ENA is set to 1, frequency comparison state machine 520 moves from state 0 to state 1. In states 1 and 3, frequency comparison state machine 520 waits for an oscillator pre-scaler leading edge to proceed. When frequency comparison state machine 520 reaches state 1, the position counter output is used to set the specified ring delay. Frequency comparison state machine 520 remains in state 1 until an oscillator pre-scaler leading edge is detected. Frequency comparison state machine 520 then moves to state 3 where it waits for a second oscillator pre-scaler leading edge. Frequency comparison state machine 520 then proceeds to state 7 where it begins frequency comparison. The wait generated by state 1 and 3 are used to wait for the ring oscillator adjustments to take effect after a change in the ring delay.

The frequency comparison states are 7, 6, and 5. Once an oscillator pre-scaler leading edge is detected in state three, frequency comparison state machine 520 progresses to state 7. In this state, frequency comparison state machine 520 looks for the occurrence of a reference pre-scaler leading or trailing edge or oscillator pre-scaler leading edge without both being present. When a stand alone reference pre-scaler edge is detected, frequency comparison state machine 520 moves to state 5. When a stand alone oscillator pre-scaler leading edge is detected, frequency comparison state machine 520 moves to state 6. When no edge is detected, the state remains 7. If an oscillator clock pre-scaler 420 leading edge is detected in state 5 before a reference clock pre-scaler 410 edge, frequency comparison state machine 520 moves back to state 7. If a reference clock pre-scaler 410 edge is detected first or coincident with an oscillator clock pre-scaler 420 leading edge, frequency comparison state machine 520 has determined that the oscillator frequency is too low and it moves to state 4.

The state activity in state 6 mirrors that of state 5. If a reference pre-scaler edge is detected in state 6 before an oscillator pre-scaler positive edge, frequency comparison state machine 520 moves back to state 7. If an oscillator pre-scaler positive edge is detected first or coincident with a reference pre-scaler edge, frequency comparison state machine 520 has determined that the oscillator frequency is too high and it moves to state 2.

Frequency comparison state machine 520 states 4 and 2 adjust ring oscillator 305 delay. When frequency comparison state machine 520 determines the oscillator frequency is too low, it moves to state 4 where the ring delay is decreased by subtracting ring delay. Either the MORE_E signal or the MORE_O signal is generated depending on the last ring control command issued as shown in Table 5. When frequency comparison state machine 520 determines the oscillator frequency is too high, it moves to state 2 where the ring delay is increased by adding ring delay. Table 5 lists the update signal sequence.

TABLE 5

| Command | Last Update | Current Update |
|---|---|---|
| MORE | MORE_E | MORE_O |
| MORE | MORE_O | MORE_E |
| MORE | LESS_E | MORE_E |
| MORE | LESS_O | MORE_O |
| LESS | LESS_E | LESS_O |
| LESS | LESS_O | LESS_E |
| LESS | MORE_E | LESS_E |
| LESS | MORE_O | LESS_O |

The next clock moves frequency comparison state machine 520 to state 0, a delay state which begins the wait for effects of update process.

Figure 10:
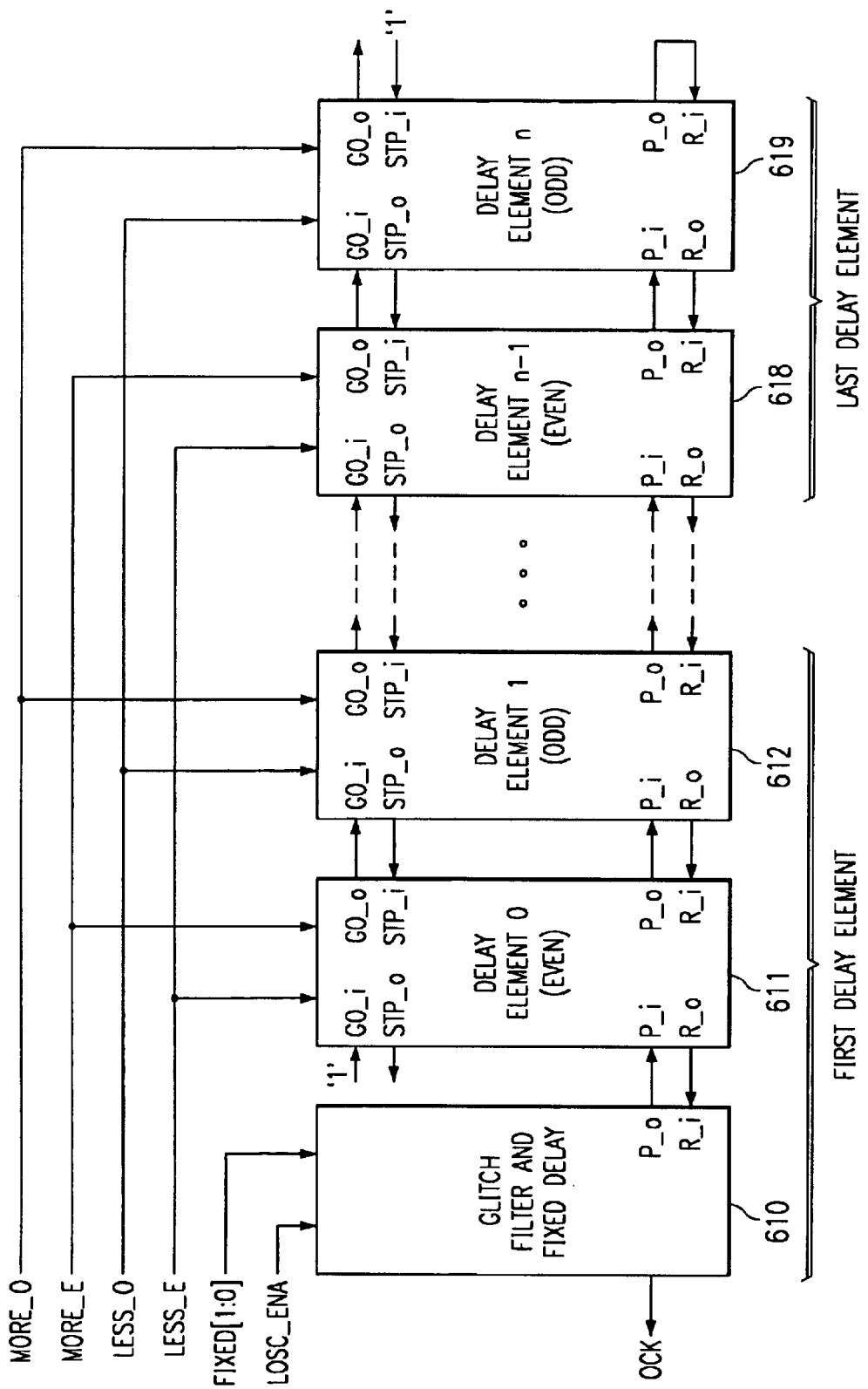
FIG. 10 illustrates the construction of the ring oscillator illustrated in FIG. 6.

FIG. 10 illustrates the structure of ring oscillator 305. Ring oscillator 305 generates the ring oscillator clock OCK. Ring oscillator 305 includes two sub-block types: glitch filter/fixed delay 610; and a number of delay elements 611 to 619. There is only one glitch filter/fixed delay 610 but there can be as many delay elements 611 to 619 as necessary to create the frequency range required.

Figure 11:
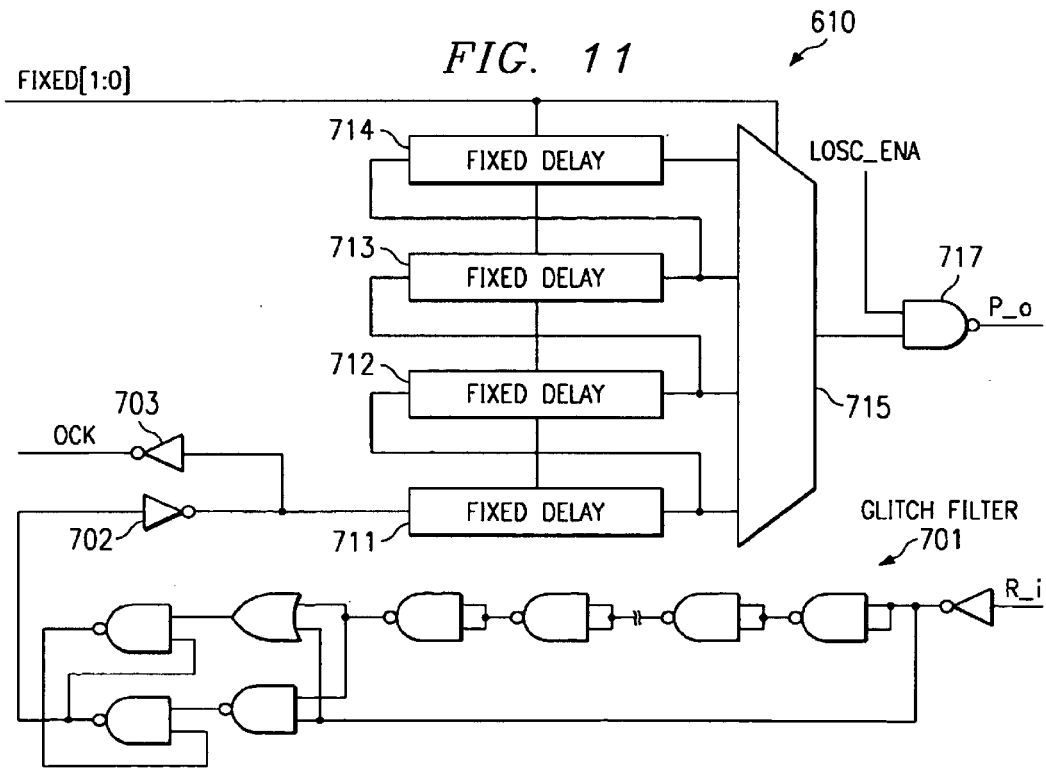
FIG. 11 illustrates the construction of the glitch filter and fixed delay illustrated in FIG. 10.

FIG. 11 illustrates the details of glitch filter/fixed delay 610 is shown in FIG. 10. Glitch filter/fixed delay 610 includes glitch filter 701, inverters 702 and 703, fixed delays 711, 712, 713 and 714, multiplexer 715 and output AND gate 717. Local oscillator 245 is turned on when local oscillator enable signal LOSC_ENA is 1. Ring oscillator signal OCK is held high when local oscillator enable LOSC_ENA is 0 by AND gate 717. Supplying the local oscillator enable signal LOSC_ENA to AND gate 717 assures that runt clock pulses will be filtered out by glitch filter 701. The output of glitch filter 701 is supplied to the chained inverters 702 and 703. The output of inverter 702 supplies the cascade fixed delays 711, 712, 713 and 714. Multiplexer 715 selects the output of one of fixed delays 711, 712, 713 and 714 as determined by the FIXED field of local oscillator control register 307. This effectively selects one, two, three or four of the fixed delays as illustrated in FIG. 5.

Glitch filter 701 is designed to reliably reject glitches, that is pulses less than a predetermined length, created by changing delay variable delay line settings on the fly. A single delay element can be switched in or out at one time. Frequency comparison state machine 520 limits the occurrence of delay adjustments to 6 clocks minimum. This assures that there is adequate time for the disconnected part of the variable delay to purge after a switch. As will be described below, generally only one element has to purge per clock.

Figure 12:
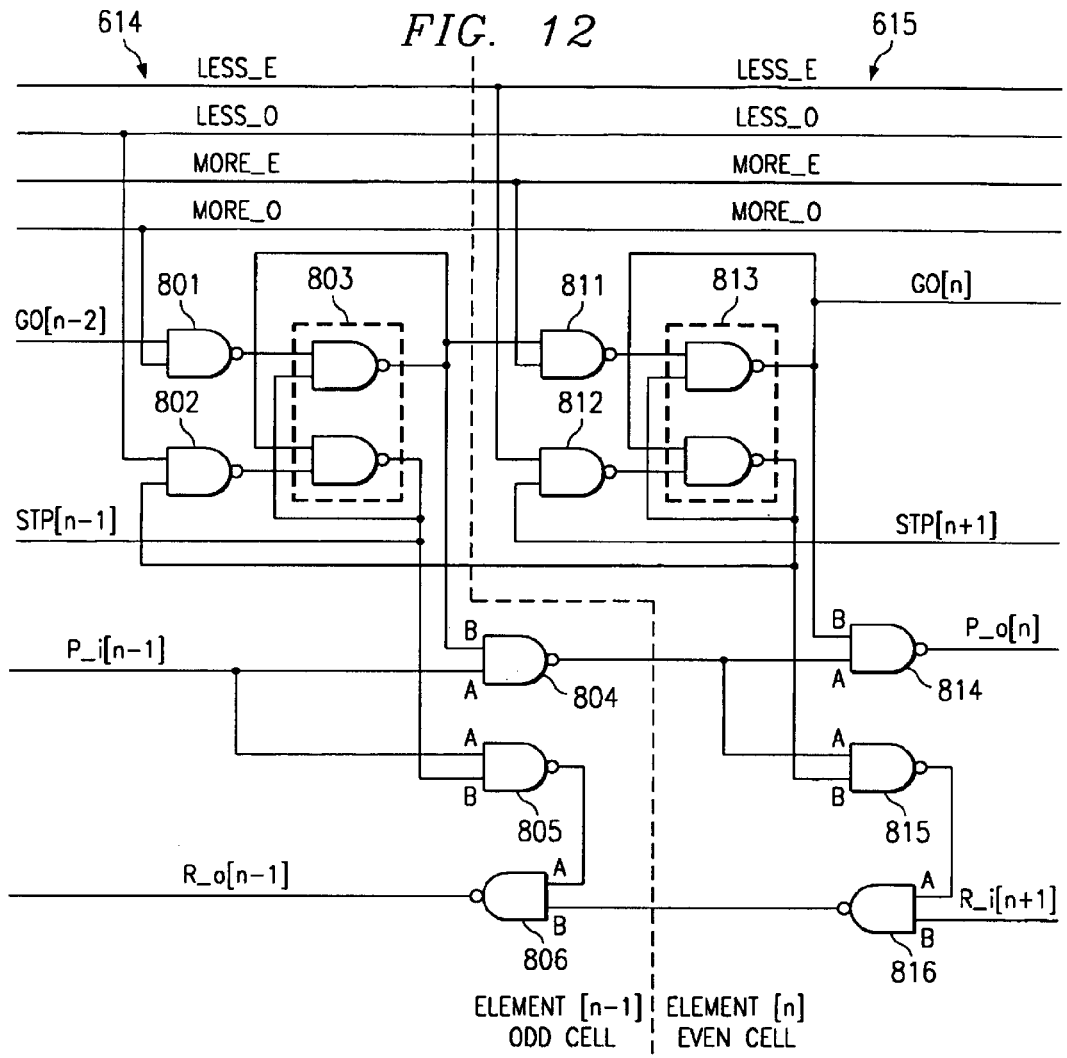
FIG. 12 illustrates the construction of an odd and even pair of delay elements of the ring oscillator illustrated in FIG. 6.

Two delay elements 614 and 615 are shown in FIG. 12. Delay element 614 is designated as odd and delay element 615 is designated as even. Delay element 614 is controlled by the MORE_O and LESS_O ring control outputs while delay element 615 is controlled by the MORE_O and LESS_O ring control outputs. Each delay element includes a pair of R-S latch control AND gates (801, 802 and 811, 812), a R-S latch (803 and 813) and a set of ring length control AND gates (804, 805, 806 and 814, 815, 816). With R-S latch 803, 813 is a first state, AND gate 804, 814 passes a received propagate signal from the prior delay element to the next delay element via a propagate output. At the same time, AND gate 805, 815 blocks return of a received propagate signal via return output via AND gate 806, 816. With R-S latch 803, 813 in the second opposite state, AND gate 805, 815 passes a received propagate signal from the prior delay element to the prior delay element via a return output. At the same time, AND gate 804, 815 blocks further propagation of a received propagate signal.

The number of delay elements included in the ring delay is controlled by a master-slave-like shift register mechanism built into each delay element. The control state of each element is stored locally in the R-S latch 803, 813. Adjacent cells (even and odd) have different clocks updating these cells. This means adjacent the control state latches can be used like the front and back ends of a master-slave flip-flop. When the cells are connected together they form a left/right shift register. The alternating MORE_O and MORE_E signals cause the shift register to shift right one bit by enabling AND gate 801, 811 to pass the GO input signal from the prior delay element to set R-S latch 803, 813. Only half the cells are updated at any one time. A cell that was last updated with a right shift will contain the last 1 when the shift register structure is viewed from left to right. When the opposite set of cells is updated, a 1 is moved into the cell to the right of the cell that previously held the last 1. This process continues as MORE_E and MORE_O are alternately generated. The circuit looks like a shift register that shifts right filling with 1.

Alternating LESS_O and LESS_E signals cause the shift register to shift left one bit by enabling AND gate 802, 812 to pass the STOP input signal from the next delay element to reset R-S latch 803, 813. Again, only half the cells are updated at any one time. A cell that was last updated with a left shift will contain the last 0 when the shift register structure is viewed from right to left. When the opposite set of cells is updated, a 0 is moved into the cell to the left of the cell that previously held the last zero. This process continues as LESS_E and LESS_O are alternately generated. The circuit looks like a shift register that shifts left, filling with 0s. When a LESS directive follows a MORE directive, it will update the same set of delay elements as the MORE directive. When a MORE directive follows a LESS directive, it will update the same set of delay elements as the LESS directive. This is clearly shown in Table 5.

This implementation efficiently employs area as each delay element consumes just 7 gates. It is also relatively easy to test with functional tests that measure the oscillator frequency.

When the control state is a zero (GO), the propagate out (P_o) signal to the next delay element is forced to a 1. Beginning from the glitch catcher and fixed delay block and proceeding through the elements, the first element with a control state (GO) that is a 0 is the point where the delay element connects P_i to R_o. This bit defines the terminating delay element. All bits to the right of the bit defining the terminating element register bits would also be 0, with these delay elements inactivated. The register can be any length necessary to implement the desired variable delay function. Changing the length does not affect the local oscillator control register 307 definitions.

Table 6 shows an example variable delay with seven delay elements. When the local oscillator is disabled, the variable delay is set to maximum or +7. This is accomplished by making MORE_E and MORE_O active simultaneously. This creates a run through condition for the storage elements and is equivalent to holding master and slave both high in a master-slave flip-flop. This propagates a 1 to the control state of all storage elements. Table 6 illustrates the state of the 6 delay element chain for various delay lengths. Note that the left most 0 defines the last delay element currently employed. As illustrated in FIG. 10, the propagate output of the last delay element 619 is connected to its return input defining the longest delay.

TABLE 6

| Delay | LOSC_ENA Glitch blk. | GO [0] even | GO [1] odd | GO [2] even | GO [3] odd | GO [4] even | GO [5] odd | GO [6] even |
|---|---|---|---|---|---|---|---|---|
| OFF | 0 | 1 | 1 | 1 | 1 | 1 | 1 | 1 |
| 7 | 1 | 1 | 1 | 1 | 1 | 1 | 1 | 1 |
| 6 | 1 | 1 | 1 | 1 | 1 | 1 | 0 | 0 |
| 5 | 1 | 1 | 1 | 1 | 1 | 0 | 0 | 0 |
| 4 | 1 | 1 | 1 | 1 | 0 | 0 | 0 | 0 |
| 3 | 1 | 1 | 1 | 0 | 0 | 0 | 0 | 0 |
| 2 | 1 | 1 | 0 | 0 | 0 | 0 | 0 | 0 |
| 1 | 1 | 0 | 0 | 0 | 0 | 0 | 0 | 0 |

Figure 13:
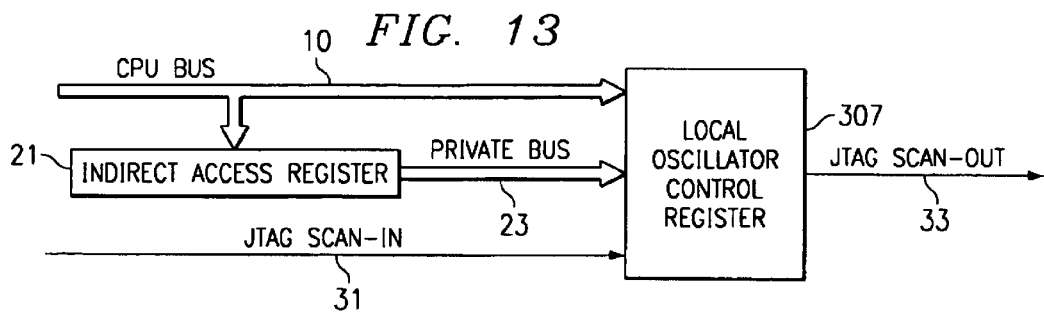
FIG. 13 illustrates the alternative manners of loading the oscillator control register illustrated in FIG. 6.

FIG. 13 illustrates the various means for loading the clock control data into local oscillator control register 307. Local oscillator control register 307 may be memory mapped into the memory space of CPU core 201 and thus accessible via CPU bus 901. Alternatively, local oscillator clock control register 307 may be written into via indirect access register 921. The data is written to indirect access register 921 from CPU bus 910. Indirect access register 921 passes the data to local oscillator control register 307 via private bus 923. It is typical for indirect access register 921 to receive control data together with the data for local oscillator control register 307. This may include routing data so that indirect access register 921 can service plural indirectly accessed registers. Note that because the real time data exchange process can control all systems available to CPU core 201, these data writes can be controlled external to target system 140 via real-time data exchange export 241, which is preferably bi-directional. As a final alternative, local oscillator control register 307 may be loaded via a JTAG serial scan system including scan-in line 931 and scan-out line 933. Any particular target system may use one, two or all these alternatives. In the preferred embodiment, oscillator 307 is loaded via indirect access register 921 which also provides indirect access to other control registers of the debug system.

What is claimed is:

1. An integrated circuit comprising:

a function clock circuit generating a function clock signal;

an operation circuit connected to said function clock circuit operating in synchronism with said function clock;

a trace trigger circuit connected to said function clock circuit and said operation circuit, said trace trigger circuit triggering trace of operation of said operation circuit upon detection of a predetermined condition within said operation circuit;

a clock circuit including
   a reference clock input for receiving a reference clock signal,
   an controllable oscillator circuit generating an oscillator clock signal,
   a multiplexer having a first input connected to said function clock circuit for receiving said function clock signal, a second input connected to said reference clock input for receiving said reference clock signal, and an output, said multiplexer selecting at said output one of said function clock signal and said reference clock signal,
   a comparison circuit connected to said multiplexer controlling a frequency of said controllable oscillator circuit to achieve a frequency match between said clock signal selected by said multiplexer and said oscillator clock signal;

a trace first-in-first-out buffer having an input connected to said function clock circuit and said operation circuit for storing trace data in synchronism with said function clock signal and an output connected to said controllable clock circuit for outputting trace data in synchronism with said oscillator clock signal; and a trace output port connected to said controllable clock circuit and said output of said trace first-in-first-out buffer outputting trace data in synchronism with said oscillator clock signal.

2. The integrated circuit of claim 1, further comprising:

an externally writeable clock control register having a mode field indicating one of a function clock mode and a reference clock mode;

said multiplexer selecting said function clock signal in said function clock mode and selecting said reference clock signal in said reference clock mode.

3. The integrated circuit of claim 1, wherein:

said clock control register includes a first divisor field storing a first clock scaling factor and a second divisor field storing a second clock scaling factor;

said integrated circuit further comprises a first pre-scalar circuit having a input connected to said output of said first multiplexer and an output connected to said comparator dividing said clock signal selected by said first multiplexer corresponding to said first clock scaling factor; and said integrated circuit further comprises a second pre-scalar circuit having a input connected to said output of said second multiplexer and an output connected to said comparator dividing said clock signal selected by said second multiplexer corresponding to said second clock scaling factor.

4. The integrated circuit of claim 1, wherein:

said at least one externally writeable clock control register is directly writeable via a bus accessible external to said integrated circuit.

5. The integrated circuit of claim 1, wherein:

said at least one externally writeable clock control register is indirectly writeable via writing to an indirect access resister which is writeable via a bus accessible external to said integrated circuit.

6. The integrated circuit of claim 1, wherein:

said at least one externally writeable clock control register is writeable via a serial scan chain accessible external to said integrated circuit.

* * * * *